(12) United States Patent
Jovanovic et al.

(10) Patent No.: US 10,258,955 B2
(45) Date of Patent: Apr. 16, 2019

(54) MICROSCALE-BASED CHEMICAL REACTOR

(71) Applicant: PTT PUBLIC COMPANY LIMITED, Chatuchak, Bangkok (TH)

(72) Inventors: Goran Nadezda Jovanovic, Corvallis, OR (US); Frederick Atadana, Chandler, AZ (US)

(73) Assignee: PTT PUBLIC COMPANY LIMITED, Bangkok (TH)

( * ) Notice: Subject to any disclaimer, the term of this patent is extended or adjusted under 35 U.S.C. 154(b) by 0 days.

(21) Appl. No.: 15/774,756

(22) PCT Filed: Nov. 14, 2016

(86) PCT No.: PCT/US2016/061814
§ 371 (c)(1),
(2) Date: May 9, 2018

(87) PCT Pub. No.: WO2017/087313
PCT Pub. Date: May 26, 2017

(65) Prior Publication Data
US 2018/0326390 A1    Nov. 15, 2018

Related U.S. Application Data

(60) Provisional application No. 62/256,570, filed on Nov. 17, 2015.

(51) Int. Cl.
*B01J 19/00*     (2006.01)
*C10G 3/00*      (2006.01)
(Continued)

(52) U.S. Cl.
CPC ....... *B01J 19/0093* (2013.01); *B01F 3/04503* (2013.01); *B01F 5/0428* (2013.01);
(Continued)

(58) Field of Classification Search
CPC .. B01J 19/0093; B01J 23/883; B01F 5/04503; B01F 13/0059; C10G 3/00
(Continued)

(56) References Cited

U.S. PATENT DOCUMENTS 7,731,918 B2    6/2010  Chellappa
7,919,056 B2 *  4/2011  Roberge ............... B01J 19/0093
                                                            422/198
(Continued)

OTHER PUBLICATIONS

International Search Report dated Mar. 6, 2017, issued in counterpart application No. PCT/US2016/061814. (2 pages).
Written Opinion dated Mar. 6, 2017, issued in counterpart application No. PCT/US2016/061814. (6 pages).

*Primary Examiner* — Huy Tram Nguyen
(74) *Attorney, Agent, or Firm* — Westerman, Hattori, Daniels & Adrian, LLP

(57) ABSTRACT

Disclosed microscale reactors comprise lamina for carrying out multi-phase reactions for making desired chemical products, such as biohydrogenated diesel (BHD). Microreactor embodiments include a bottom clamp plate, a top clamp plate, and at least one catalyst plate positioned between and operatively associated with the bottom clamp plate and the top clamp plate. Catalyst plates include a catalyst associated for catalyzing the production of product from feedstock. To address the problems encountered when using microchannel reactors, the microscale-based reactors may include a mixer plate assembly and/or at least one catalyst lamina comprising an array of microscale posts. Disclosed microreactor systems for producing BHD include a feedstock source, a hydrogen source and an inert gas source each fluidly coupled to respective microreactor inlets. Certain method embodiments include operating a microreactor or a microreactor system to produce BHD from a suitable feedstock selected from animal fats, vegetable oils, or combinations thereof.

20 Claims, 23 Drawing Sheets

(51) Int. Cl.
*B01J 23/883* (2006.01)
*B01F 3/04* (2006.01)
*B01F 5/04* (2006.01)
*B01F 13/00* (2006.01)

(52) U.S. Cl.
CPC ......... *B01F 13/0059* (2013.01); *B01J 23/883* (2013.01); *C10G 3/00* (2013.01); *B01J 2219/0086* (2013.01); *B01J 2219/00783* (2013.01); *B01J 2219/00808* (2013.01); *B01J 2219/00822* (2013.01); *B01J 2219/00824* (2013.01); *B01J 2219/00835* (2013.01); *B01J 2219/00855* (2013.01); *B01J 2219/00873* (2013.01); *B01J 2219/00889* (2013.01); *B01J 2219/00894* (2013.01); *B01J 2219/00963* (2013.01); *B01J 2219/00986* (2013.01); *Y02E 50/13* (2013.01); *Y02P 30/20* (2015.11)

(58) Field of Classification Search
USPC .......................................................... 422/602
See application file for complete search history.

(56) References Cited

U.S. PATENT DOCUMENTS

| | | |
|---|---|---|
| 2004/0156762 A1 | 8/2004 | Schuppich et al. |
| 2007/0053808 A1 | 3/2007 | Markowz et al. |
| 2007/0214712 A1 | 9/2007 | Garwood |
| 2009/0165366 A1 | 7/2009 | Jovanovic et al. |

* cited by examiner

MICROSCALE-BASED CHEMICAL REACTOR

CROSS REFERENCE TO RELATED APPLICATION

This application claims priority to U.S. Provisional Application No. 62/256,570, filed on Nov. 17, 2015, which is herein incorporated by reference in its entirety.

FIELD

The present disclosure concerns microscale-based reactors. Certain disclosed embodiments are useful for performing chemical reactions, particularly catalyzed, multiphase (e.g. liquid-gas two phase) chemical reactions, such as for the production of biohydrogenated diesel (BHD) fuels. Also disclosed herein are embodiments of methods for making and using the microscale reactor device.

BACKGROUND

Renewable transportation fuels from biological sources (biofuels) offer a sustainable alternative to current fossil sources. Biofuel has a tremendous advantage relative to fossil fuels since the production and use of biofuels can be carbon neutral. Bioethanol and fatty acid methyl ester (FAME) are the main renewable transportation fuels commercially available. Despite the interest, production of renewable transportation fuels like FAME has found little integration into existing refineries due to compatibility issues and processing bottlenecks.

For a good transportation fuel, renewable diesel should have at least some of the desired hydrocarbon constituents of petro diesel. BHD obtained by reaction of glycerides, such as triglycerides, with hydrogen at high temperature and pressure to produce liquid alkanes offers similar or better quality diesel fuel as compared to petro diesel and FAME. The BHD platform also provides raw material flexibility, accommodating a variety of oils sources, including numerous vegetable oils, such as oils derived from palm, jatropha, canola, and others.

The current state of BHD production is based on large scale batch reactor systems. These reactor systems have several major disadvantages, such as mass and heat transfer limitations, which result in inefficient use of catalyst and large energy requirements. Similarly, in conventional multiphase reactors, which are typically fluidized bed or fixed bed reactors, reactions are limited by mass transfer due to the relatively low specific interfacial area attained by these reactor designs. There is in an inherent limitation in the rate of mass transfer between the bulk phase and the catalyst surface, limiting the overall efficiency such reactors can achieve.

A need therefore exists for an efficient, compact, continuous, and scalable apparatus, and method for using such apparatus, to produce BHD and similar products.

SUMMARY

Microscale-based reactors overcome the mass and heat transfer limitations associated with conventional reactors. In microchannel reactors, flows, typically laminar, take place in channels with a characteristic length scale of less than a millimeter. Due to this very small length scale, these reactors have a very high surface-to-volume ratio that significantly effects mass transfer by reducing mass transfer distances, thus decreasing transfer resistance between process fluids and channel walls. As feedstock flows through such reactors, mass transfer between bulk phase and catalyst surface primarily occurs by diffusion, which can eliminate the mass transfer effect limitation. However, microchannel reactors comprising channels for gas-liquid reactions catalyzed by solids may encounter significant problems. For example, channel clogging leads to flow channeling and high pressure drops. Moreover, sometimes gas-liquid reactions are not completed in the channel because multiphase reactants are not well mixed and in good intimate contact with catalyst at a channel wall.

The current disclosure concerns embodiments of a microscale-based reactor with small time and length scales, typically on the order of seconds to fractions of a second and less than a millimeter in at least one dimension, respectively, that improve mass and heat transfer. Disclosed reactor embodiments have a very high specific surface-to-volume ratio, on the order of approximately $10^5$ square meters of reactor area per cubic meter of reactor volume, allowing for more efficient utilization of space, materials, and energy. Certain disclosed embodiments are modular and can therefore easily scale continuous production by increasing the number of reactors operating in parallel.

Disclosed microscale reactors comprise lamina (also referred to as plates) for carrying out multi-phase reactions for the production, typically continuous production, of chemical products, such as biohydrogenated diesel (BHD). Microreactor embodiments typically comprise a bottom clamp plate, a top clamp plate, and at least one catalyst plate positioned between and operatively associated with the bottom clamp plate and the top clamp plate. Catalyst plates include a catalyst associated therewith for catalyzing the production of product from a suitable feedstock. The catalyst plate defines a reaction area whereby fluid feedstock flowing into the reactor is exposed to the catalyst. The reaction area may include plural internal support posts. These support posts can be formed, for example, by chemical etching or micromachining.

At least one of the bottom clamp plate, the top clamp plate and the catalyst plate includes a feedstock inlet port for receiving a flow of feedstock, a hydrogen input port for receiving a flow of hydrogen for mixing with the feedstock, and an exit port for receiving a flow of product produced by the microreactor. The microreactor may further comprise an inert gas inlet port and an inert gas outlet port for receiving a flow of inert gas. Microreactors also may include a feedstock input manifold for receiving feedstock flow from the feedstock inlet port. A feedstock injection slot may be fluidly associated with a hydrogen input port for mixing feedstock with hydrogen. The feedstock injection slot may include a venturi restriction adjacent the hydrogen input port to increase flow velocity to shear incoming hydrogen into bubbles to facilitate forming a two-phase, feedstock-hydrogen mixture for distribution to the reaction area.

To address the problems encountered when using microchannel reactors, the microscale-based reactors may comprise a mixer plate assembly and/or at least one catalyst lamina comprising an array of microscale posts to facilitate conducting gas-gas, liquid-liquid or gas-liquid reactions. Again, these microposts can be formed by any suitable technique, such as chemical etching or micromachining. The microposts may serve multiple functions: they may act as local mixers with minimal increased pressure drop; they may facilitate the reaction process by disrupting the flow to create increased interfacial area between the liquid and gas reactant phases; they may create additional surface area for catalyst; they may improve robustness by localizing clogging effects; they may prevent or localize retardation of discrete phases, which leads to inefficiencies characteristic of other microchannel architectures; they may increase reactor efficiency; they may improve conversion, improve yield, and/or improve selectivity of a chemical reaction; or any and all combinations of these benefits, relative to a microreactor plate that does not comprise an array of microscale posts.

The microreactor may, for example, comprise a catalyst lamina defining a reaction zone. Microposts arranged in the reaction zone are coated with a catalyst. The coating process may be used to produce a substantially uniform coating on the microposts, or may produce areas having a first catalyst coating density and areas having a second catalyst coating density. In certain working embodiments the catalyst was Ni—Mo on an alumina support (designated Ni—Mo/Al$_2$O$_3$).

Disclosed reactor embodiments also may comprise two lamina with arrays of microscale post structures (microposts) on each lamina facing each other at a distance of less than one millimeter. This architecture creates a sheet of fluid flow with one characteristic dimension on the micrometer scale.

The microposts may be sized, shaped and positioned to disrupt a phase interface between liquid and gaseous reactants to create reaction zones. For example, the microposts may be from about 0.1 millimeter to at least about 1 millimeter, such as 0.3 to 0.5 millimeters, tall and in diameter. The microposts may be substantially uniform in size and shape, or may vary in size and shape. The microposts may be substantially cylindrical, square, rectangular, pyramidal, tear-drop, elliptical, polygonal, or combinations thereof. For certain working embodiments, the microreactor included plural microposts with a center-to-center spacing between adjacent microposts of no more than 5:1 of the post height, and in particular exemplary embodiments had a center-to-center spacing of about 1.0 millimeter. Where an array of microposts is included in microreactors, the plural microposts may be arranged in a staggered configuration, or in a substantially uniform distribution. The array may have a gradient in density, a gradient in size, or both a gradient in density and a gradient in size, from one end of the device to another end.

Disclosed microreactors may be part of a system designed to produce desired products, such as BHD. For example, suitable systems may include a feedstock source, a hydrogen source and an inert gas source each fluidly coupled to respective microreactor inlets, and a product line fluidly coupled to a product outlet port to receive product made by the microreactor. The feedstock input line may include a feedstock pump, a pressure gauge, an inline feedstock filter, or combinations thereof. The hydrogen input line may include a hydrogen pressure regulator, a hydrogen pressure gauge, an inline hydrogen filter, or combinations thereof. And the inert gas input line may include an inert gas pressure regulator, an inert gas pressure gauge, an inline inert gas filter, or combinations thereof. A fluid valve fluidly coupled to the source of hydrogen and to the source of inert gas may be provided for selectively introducing a desired hydrogen gas flow or inert gas flow to the microreactor. The system may also include a computer operably coupled to the system for controlling system functions.

Materials used to construct microreactors, and the dimensions thereof, may be further determined by considering particular desired operating conditions and products as will be understood by a person of ordinary skill in the art. However, for certain disclosed embodiments, the microreactors were made from steel, such as 316 stainless. Microreactor lamina for working embodiments had a thickness of 1 mm or greater, such as from about 15 millimeters to about 30 millimeters thick.

Additional embodiments concern plural microreactors or microreactor systems operating in parallel.

Embodiments of a method for using the disclosed microreactors and systems comprising the microreactors also are disclosed. Certain method embodiments include operating a microreactor or a microreactor system to produce BHD from a suitable feedstock selected from animal fats, vegetable oils, or combinations thereof. Suitable exemplary oils include castor oil, coconut oil, soybean oil, rapeseed oil, jatropha oil, mahua oil, mustard oil, flax oil, sunflower oil, linseed oil, olive oil, palm oil, peanut oil, thistle oil, hemp oil, field pennycress oil, or combinations thereof. For certain embodiments the feedstock was a glyceride, olein, palm stearin, a fatty acid, such as arachidonic acid, arachic acid, eicosenoic acid, elaidic acid, erucic acid, docosadienoic acid, gadoleic acid, hexadecenoic acid, lauroleic acid, linolaidic acid, linoleic acid, linolenic acid, myristic acid, myristoleic acid, oleic acid, palmitic acid, palmitoleic acid, petroselaidic acid, ricinoleic acid, esters thereof, or any combination thereof. The feedstock may be fed to the microreactor neat, or as mixture with other materials, such as aliphatic hydrocarbons.

Operating parameters may be further determined by considering desired products, production amounts, etc., as will be understood by a person of ordinary skill in the art. However, for certain disclosed embodiments the microreactor or microreactor system operated at an inlet pressure of from 100 psig to about 700 psig. For example, the feedstock may be fed to the microreactor or microreactor system at an inlet pressure of from about 400 psig to about 500 psig. To produce BHD, the catalyst typically includes a metal, such as molybdenum, platinum, palladium, rhodium, ruthenium, nickel, or mixtures thereof, with particular catalysts including Raney nickel, Urushibara nickel, or Ni—Mo/Al$_2$O$_3$.

To produce BHD, the method also may include purging the microreactor or microreactor system with an inert gas, and then introducing hydrogen to the microreactor or microreactor system to provide a hydrogen-rich atmosphere suitable for forming BHD. A hydrogen-to-feedstock molar ratio of greater than a 1:1 molar ratio up to at least about a 50:1 molar ratio is typical for producing BHD. Furthermore, the typical operating temperature is from 20° C. up to at least 400° C., more typically from about 275° C. to about 325° C. The typical operating pressure is from about 1.5 MPa to about 3.5 MPa.

The foregoing and other objects, features, and advantages of the invention will become more apparent from the following detailed description, which proceeds with reference to the accompanying figures.

DETAILED DESCRIPTION

I. Definitions

Figure 1:
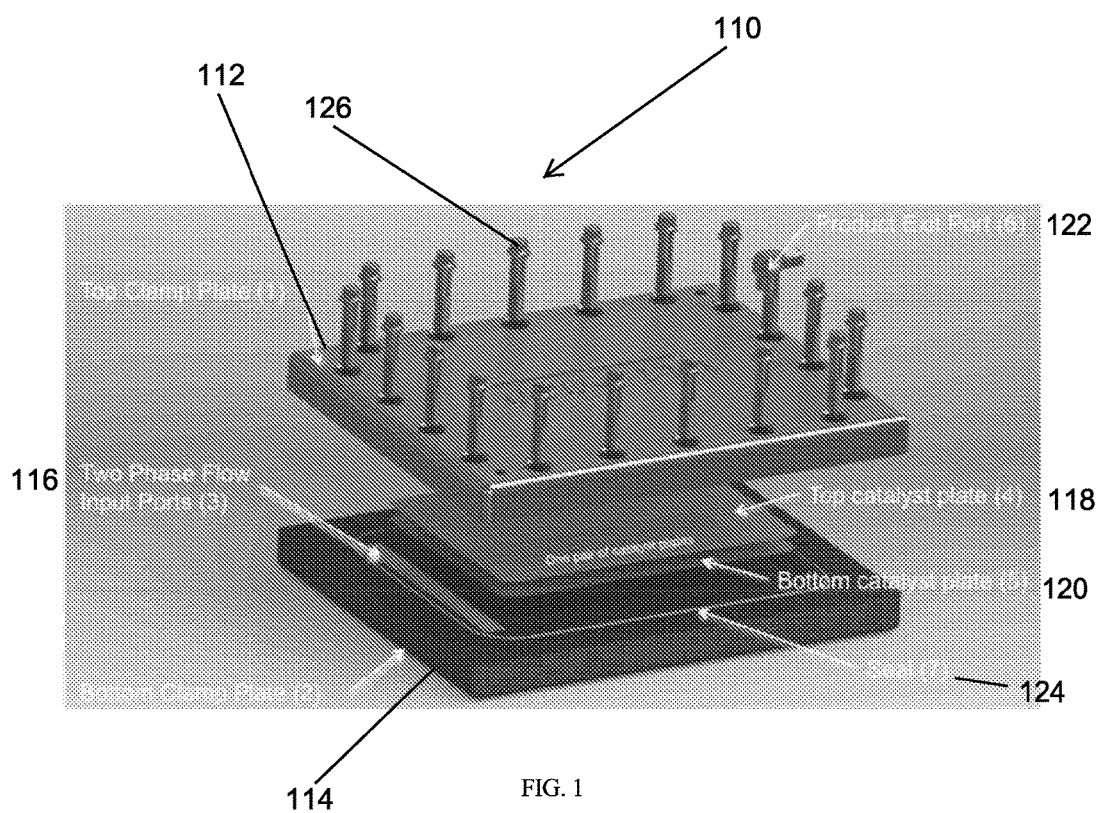
FIG. 1 is an exploded perspective view of an exemplary microreactor embodiment comprising two lamina catalyst plates, a fluid inlet port and manifold, top and bottom clamp plates, and fluid seal.

The following explanations of terms and methods are provided to better describe the present disclosure and to guide those of ordinary skill in the art in the practice of the present disclosure. The singular forms "a," "an," and "the" refer to one or more than one, unless the context clearly dictates otherwise. The term "or" refers to a single element of stated alternative elements or a combination of two or more elements, unless the context clearly indicates otherwise. As used herein, "comprises" means "includes." Thus, "comprising A or B," means "including A, B, or A and B," without excluding additional elements. All references, including patents and patent applications cited herein, are incorporated by reference.

Unless otherwise indicated, all numbers expressing quantities of components, molecular weights, percentages, temperatures, times, and so forth, as used in the specification or claims are to be understood as being modified by the term "about." Accordingly, unless otherwise indicated, implicitly or explicitly, the numerical parameters set forth are approximations that may depend on the desired properties sought and/or limits of detection under standard test conditions/methods as will be understood by a person of ordinary skill in the art. When directly and explicitly distinguishing embodiments from discussed prior art, the embodiment numbers are not approximates unless the word "about" is recited.

Unless explained otherwise, all technical and scientific terms used herein have the same meaning as commonly understood to one of ordinary skill in the art to which this disclosure pertains. Although methods and materials similar or equivalent to those described herein can be used in the practice or testing of the present disclosure, suitable exemplary methods and materials are described below. The materials, methods, and examples are illustrative only and not intended to be limiting.

When chemical structures are depicted or described, unless explicitly stated otherwise, all carbons are assumed to include hydrogen so that each carbon conforms to a valence of four.

Sometimes a particular atom in a structure is described in textual formula as having a hydrogen or hydrogen atoms, for example —$CH_2CH_2$—. It will be understood by a person of ordinary skill in the art that the aforementioned descriptive techniques are common in the chemical arts to provide brevity and simplicity to description of organic structures.

A person of ordinary skill in the art will appreciate that the definitions may be combined to further describe a particular compound. For example, hydroxyaliphatic refers to an aliphatic group substituted with a hydroxy (—OH) group, and haloalkyl refers to an alkyl group is substituted with a halogen.

Acyl: An organic functional group having the general formula —C(O)R, where R is hydrogen, alkyl, heteroalkyl, haloalkyl, aliphatic, heteroaliphatic, aryl, or heteroaryl.

Adsorption: The physical adherence or bonding of ions and molecules onto the surface of another molecule. An ion or molecule that adsorbs is referred to as an adsorbate. Adsorption can be characterized as chemisorption or physisorption, depending on the character and strength of the bond between the adsorbate and the substrate surface.

Alcohol: An organic compound including at least one hydroxyl group. Alcohols may be monohydric (including one —OH group), dihydric (including two —OH groups; diols, such as glycols), trihydric (including three —OH; triols, such as glycerol) groups, or polyhydric (including three or more —OH groups; polyols). The organic portion of the alcohol may be aliphatic, cycloaliphatic (alicyclic), heteroaliphatic, cycloheteroaliphatic (heterocyclic), polycyclic, aryl, or heteroaryl, and may be substituted or unsubstituted.

Aldehyde: A carbonyl-bearing functional group having a formula

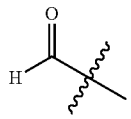

where the line drawn through the bond indicates that the functional group can be attached to any other moiety, but that such moiety simply is not indicated.

Aliphatic: A substantially hydrocarbon-based compound, or a radical thereof (e.g., $C_6H_{13}$, for a hexane radical), including alkanes, alkenes, alkynes, including cyclic versions thereof, and further including straight- and branched-chain arrangements, and all stereo and position isomers as well. Unless expressly stated otherwise, an aliphatic group contains from one to twenty-five carbon atoms; for example, from one to twenty, more typically from four to eighteen carbon atoms. An aliphatic chain may be substituted or unsubstituted. Unless expressly referred to as an "unsubstituted aliphatic," an aliphatic group can either be unsubstituted or substituted. An aliphatic group can be substituted with one or more substituents (up to two substituents for each methylene carbon in an aliphatic chain, or up to one substituent for each carbon of a —C=C— double bond in an aliphatic chain, or up to one substituent for a carbon of a terminal methine group).

Alkoxy: A radical (or substituent) having the structure —OR, where R is a substituted or unsubstituted aliphatic group, such as an alkyl group. Methoxy (—OCH₃) is an exemplary alkoxy group. In a substituted alkoxy, R is alkyl substituted with a non-interfering substituent.

Alkyl or Alkane: A hydrocarbon group having a saturated carbon chain. The chain may be cyclic, branched or unbranched and unbranched groups may be designated nCx, where n means "normal," which mean that the group is not branched, and has X number of carbons. For example, nC18 refers to an unbranched alkane having 18 carbon atoms. The terms alkenyl and alkynyl refer to hydrocarbon groups having carbon chains containing one or more double or triple bonds, respectively.

Bioethanol: Ethanol derived from biomass, e.g., plant matter. Typically, bio-ethanol is produced from agricultural feedstocks, such as corn, sugar cane, etc. Bio-ethanol also can be produced from other cellulose-containing organic matter, such as grass, straw, wood chips, etc.

Biohydrogenated diesel (BHD): BHD refers to a fuel obtained by converting natural products or derivatives thereof, such as ester derivatives of fatty acids, to fuel suitable compounds. BHD is an alkane, or mixture of alkanes, that typically, but not necessarily, are liquids at room temperature. A BHD component typically has an average molecular formula of $C_nH_{2n+m}$, wherein n is less than 30, generally 28 or less, typically from 4 to 28, typically 12 to about 28, and even more typically from 14 to 22, such as 16, 17, 18, 19, 20, 21 or 22, and m ranges from 0 to 2. The boiling points of such liquids are between about 170° C. and 360° C. The hydrocarbons of gasoline typically range from 4 to 12 carbon atoms, more typically from 6 to about 12 carbon atoms, with a boiling range of from about 30° C. to about 210° C. Suitable natural product feedstocks may be obtained from animals and/or plant sources, more typically plant sources. Suitable feedstocks are those that produce BHD upon reaction with hydrogen. Reaction with hydrogen may comprise a hydrogenation or hydrodeoxygenation reaction. By way of example, suitable feedstocks include biomolecules and oils, including glycerides. Glycerides may be mono-, di- and/or tri-glycerides, and di- and tri-glycerides may have the same or different acid components. Fatty acids and/or esters thereof also are suitable feedstocks for forming BHD.

Carboxyalkyl: A functional group with the formula —COOR where R is alkyl.

Carboxyl: A —COOH radical or functional group.

Carboxylic Acid: A carbonyl-bearing functional group having a formula RCOOH where R is aliphatic, heteroaliphatic, alkyl, or heteroalkyl.

Catalyst: A substance, usually present in small amounts relative to reactants, which facilitates a particular reaction, such as by increasing the rate of a chemical reaction. A catalyst also may enable a reaction to proceed under different conditions (e.g., at a lower temperature) than otherwise possible. Catalysts typically catalyze reactions without being consumed or undergoing a chemical change, or at least not an irreversible chemical change. Catalysts typically are highly specific with respect to the reactions in which they participate. Some catalysts have a limited lifetime, after which they must be replaced or regenerated. For example, reaction products or by-products may deposit on the catalyst's surface, reducing its activity.

Cetane number: A measurement of diesel fuel's combustion quality during compression ignition. The cetane number is comparable to the octane-number rating for gasoline. The higher the cetane number, the more easily the fuel can be ignited. The cetane number is the percentage of cetane ($C_{16}H_{34}$) that must be mixed with heptamethylnonane (cetane number=0) to give the same ignition performance under standard conditions as the fuel being rated.

Cracking: A refining process involving decomposition and molecular recombination of long-chain hydrocarbons into shorter hydrocarbons. Thermal cracking exposes the hydrocarbons to temperatures of about 500-900° C. for varying periods of time. Catalytic cracking occurs when heated hydrocarbon vapors (about 400° C.) are passed over metallic catalysts (e.g., silica-alumina or platinum). In hydrocracking, a catalyst is used and hydrogen is added to produce primarily saturated hydrocarbons.

Derivative: A compound that is derived from a similar compound or a compound that can be imagined to arise from another compound, for example, if one atom is replaced with another atom or group of atoms. The latter definition is common in organic chemistry. In biochemistry, the word is used for compounds that at least theoretically can be formed from the precursor compound.

Ester: A chemical compound derived from an organic acid (general formula: RCO₂H) where the hydrogen of the —OH (hydroxyl) group is replaced by an aliphatic, alkyl or aryl group. A general formula for an ester derived from an organic acid is shown below:

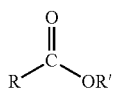

where R and R' denote virtually any group, including aliphatic, substituted aliphatic, aryl, arylalkyl, heteroaryl, etc.

Fatty acid: A carboxylic acid having a long, unbranched, aliphatic chain or tail. Fatty acids contain from 4 to 26 carbon atoms (usually an even number if the fatty acid is a biomolecule or naturally occurring). Fatty acids can be represented by the general formula RCOOH, where R is a saturated or unsaturated aliphatic chain. Saturated fatty acids can be described by the general formula $CH_3(CH_2)_xCOOH$. Most natural fatty acids have an aliphatic chain that has at least eight carbon atoms and an even number of carbon atoms (including the carbon atom in the carboxyl group). The fatty acid may be a liquid, semisolid, or solid.

Functional group: A specific group of atoms within a molecule that is responsible for the characteristic chemical reactions of the molecule. Exemplary functional groups include, without limitation, alkane, alkene, alkyne, halo (fluoro, chloro, bromo, iodo), hydroxyl (OH), carbonyl (ketone), aldehyde (HCOR), ester (COOR), and carboxylate (COO⁻).

Hydrocarbon: An organic compound consisting of the elements carbon and hydrogen. Hydrocarbons typically are derived from petroleum, coal tar, and plant sources. Hydrocarbons include aliphatic compounds (alkanes, alkenes, alkynes, and cyclic versions thereof, including straight- and branched-chain arrangements), aromatic compounds (unsaturated, cyclic hydrocarbons having alternate single and double bonds), and combinations thereof (e.g., arylalkyl compounds).

Isomer: One of two or more molecules having the same number and kind of atoms, but differing in the arrangement or configuration of the atoms. Isomers that differ in the arrangement of their atoms in space are termed "stereoisomers". E/Z isomers are isomers that differ in the stereochemistry of a double bond. An E isomer (from entgegen, the German word for "opposite") has a trans-configuration at the double bond, in which the two groups of highest priority are on opposite sides of the double bond. A Z isomer (from zusammen, the German word for "together") has a cis-configuration at the double bond, in which the two groups of highest priority are on the same side of the double bond. The E and Z isomers of 2-butene are shown below:

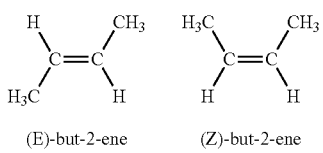

(E)-but-2-ene      (Z)-but-2-ene

Ketone: A carbonyl-bearing substituent having a formula

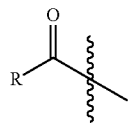

where R is virtually any group, including aliphatic, substituted aliphatic, aryl, arylalkyl, heteroaryl, etc.

Molecular weight: The sum of the atomic weights of the atoms in a molecule. As used herein with respect to polymers, the terms molecular weight, average molecular weight, and mean molecular weight refer to the number-average molecular weight, which corresponds to the arithmetic mean of the molecular weights of individual macromolecules. The number-average molecular weight may be determined by any method generally known by persons of ordinary skill in the art, such as chromatographic methods.

Monomer: A molecule or compound, usually containing carbon, that can react and combine to form polymers. For example, carboxylic acids (e.g., oleic acid, palmitic acid, among others). Molecules formed by the combination of monomers can be characterized by the number of monomers. For example, a dimer is a molecule formed from two monomers, a trimer is a molecule formed from three monomers, etc.

Olefin: An unsaturated aliphatic hydrocarbon having one or more double bonds. Olefins with one double bond are alkenes; olefins with two double bonds are alkadienes or diolefins. Olefins typically are obtained by cracking petroleum fractions at high temperatures.

Polymer: A molecule of repeating structural units (e.g., monomers) formed via a chemical reaction, i.e., polymerization.

Substituted: A fundamental compound, such as an aliphatic compound, or a radical thereof, having coupled thereto one or more substituents, each substituent typically replacing a hydrogen atom on the fundamental compound. Solely by way of example and without limitation, a long-chain hydrocarbon may have a hydroxyl group bonded thereto.

II. Device Embodiments

Certain embodiments of the present invention concern a microscale-based reactor, or microreactor. Certain disclosed embodiments concern a microreactor comprising a pair of clamp plates, a mixer plate assembly, and a catalyst laminate plate or plates comprising one or more microscale posts. The microscale posts act as static mixers, with only a modest increase in pressure drop. When various fluids, including mixed phases, such as liquid-gas mixed phases, flow through the microreactor, they may be well mixed by a mixer plate assembly. As a result, the problem of channel clogging in microchannel devices or high pressure drop from fluid plugging is substantially reduced or eliminated by using microposts, thereby increasing reactor efficiency, improving conversion, yield and selectivity of a chemical reaction.

FIG. 1 is a disassembled perspective view illustrating one embodiment 110 of a microreactor according to the present invention. Microreactor 110 includes a top clamp plate 112 and a bottom clamp plate 114. Bottom clamp plate 114 includes a feedstock input port 116, particularly a multi-phase input port, such as a two phase fluid input port for receiving a liquid feedstock and a flow of hydrogen. Embodiment 110 further includes a top catalyst plate 118 and a bottom catalyst plate 120. Top clamp plate further includes a product exit port 122. Since the embodiments are intended for fluid flow certain embodiments also include a seal 124.

Reactor embodiments according to the present invention may operate at relatively high temperatures and pressures, and are receiving flows of hydrogen resulting in combustible mixtures of materials. Accordingly, reactor components are made of relatively high strength materials, such as steel, aluminum, titanium, and/or ceramics. Certain working embodiments used 316 stainless steel, and had a plate thickness of from about 15 millimeters to about 30 millimeters, more typically from about 19 millimeters to about 25 millimeters thick. These plate thicknesses were suitable for withstanding pressures encountered during BHD production.

Figure 2:
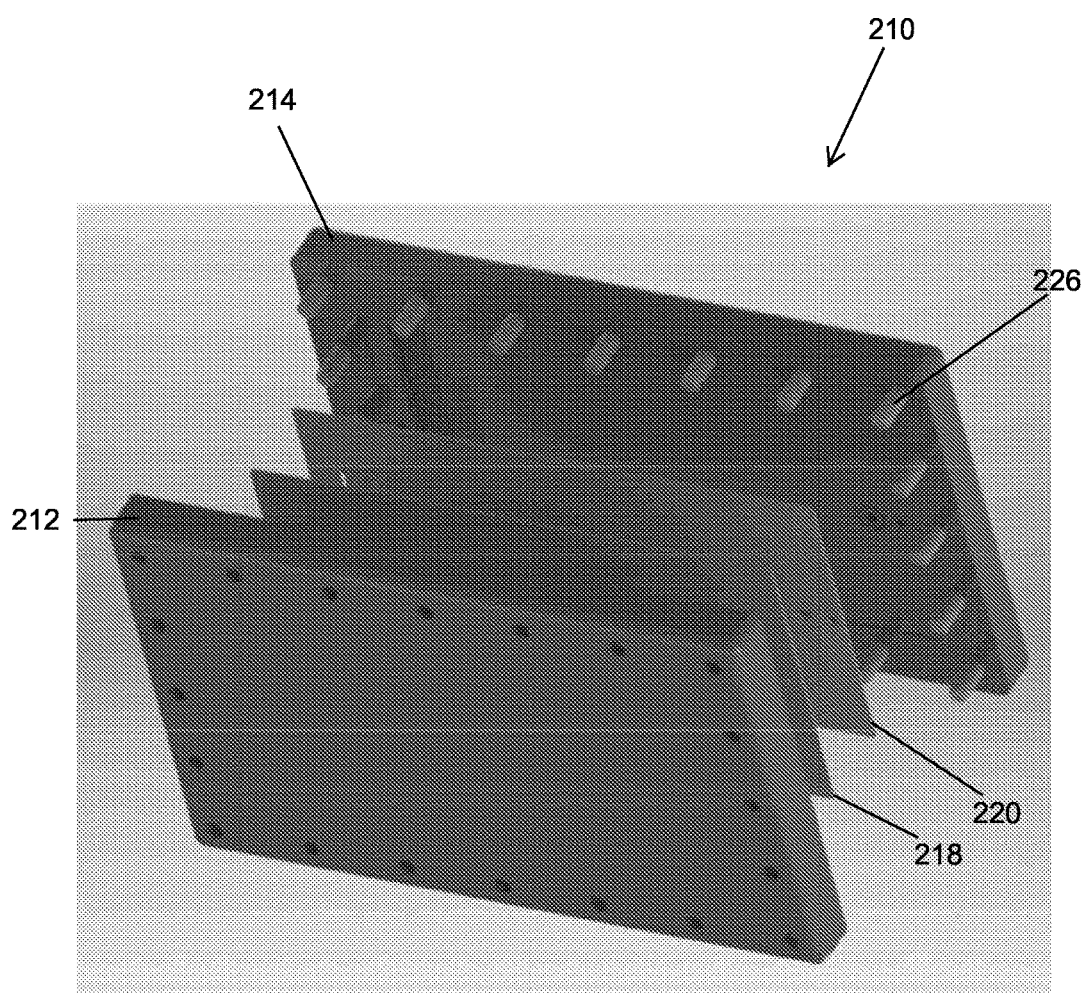
FIG. 2 is an exploded perspective view of an exemplary embodiment of the device comprising two lamina catalyst plates and a top clamp plate and a bottom clamp plate.

FIG. 2 is a disassembled perspective view illustrating a microreactor embodiment 210 comprising a top clamp plate 212 and a bottom clamp plate 214. As with the embodiment of FIG. 1, the embodiment of FIG. 2 includes a top catalyst plate 218 and a bottom catalyst plate 220. As with the embodiment of FIG. 1, embodiment 210 also includes plural clamping fasteners to clamp the bottom plate to the top plate in an assembled device.

Figure 3:
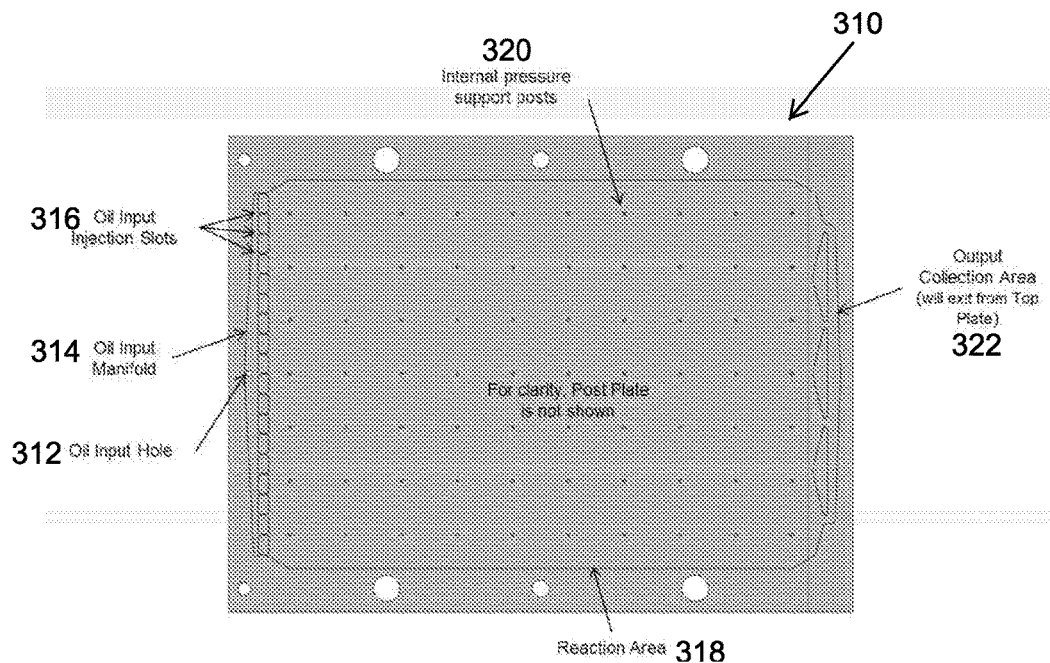
FIG. 3 is a plan view of an exemplary plate comprising a feedstock (e.g. vegetable oil), input port, and a distribution manifold for distributing fluid flows to plural feedstock injection slots to provide flow throughout the reactor area and where hydrogen is mixed with the feedstock.

FIG. 3 is a plan view illustrating a plate 310 comprising a feedstock input port 312, a feedstock input manifold 314, and plural feedstock input injection slots 316. Plate 310 defines a reaction area 318. Plural internal support posts 320 are included within reaction area 318. At an opposite end of the plate 310 is an output collection area 322, such as a BHD product output collection area. For certain working embodiments, the reaction area had length and width dimensions of from about 50 millimeters to at least about 500 millimeters, more typically from about 100 to about 200 millimeters, with certain working embodiments having dimensions of about 200 mm and about 145 mm. The total plate size for these working embodiments was about 247 mm by about 178 mm A person of ordinary skill in the art will appreciate that the reactor area and total size are largely design choices, and can be larger or smaller than those of these exemplary working embodiments. Product throughput also can be increased by operating a number of different microreactors in parallel.

Figure 4:
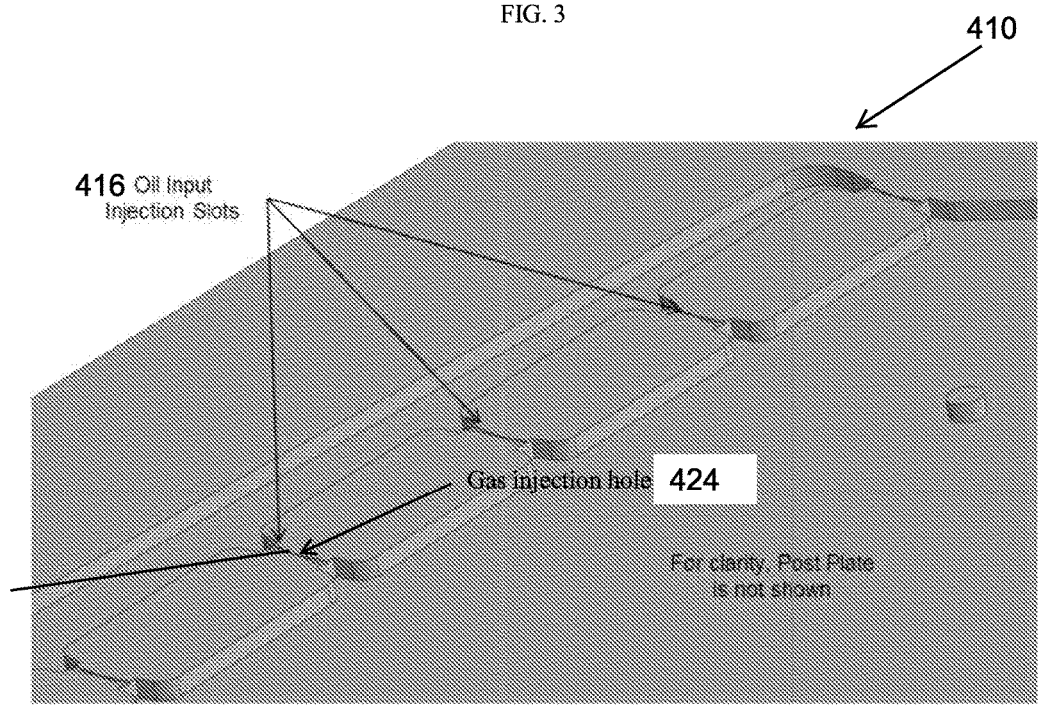
FIG. 4 is a perspective view of feedstock injection slot in an exemplary embodiment with constrictions at the point of gas injection.
Figure 4A:
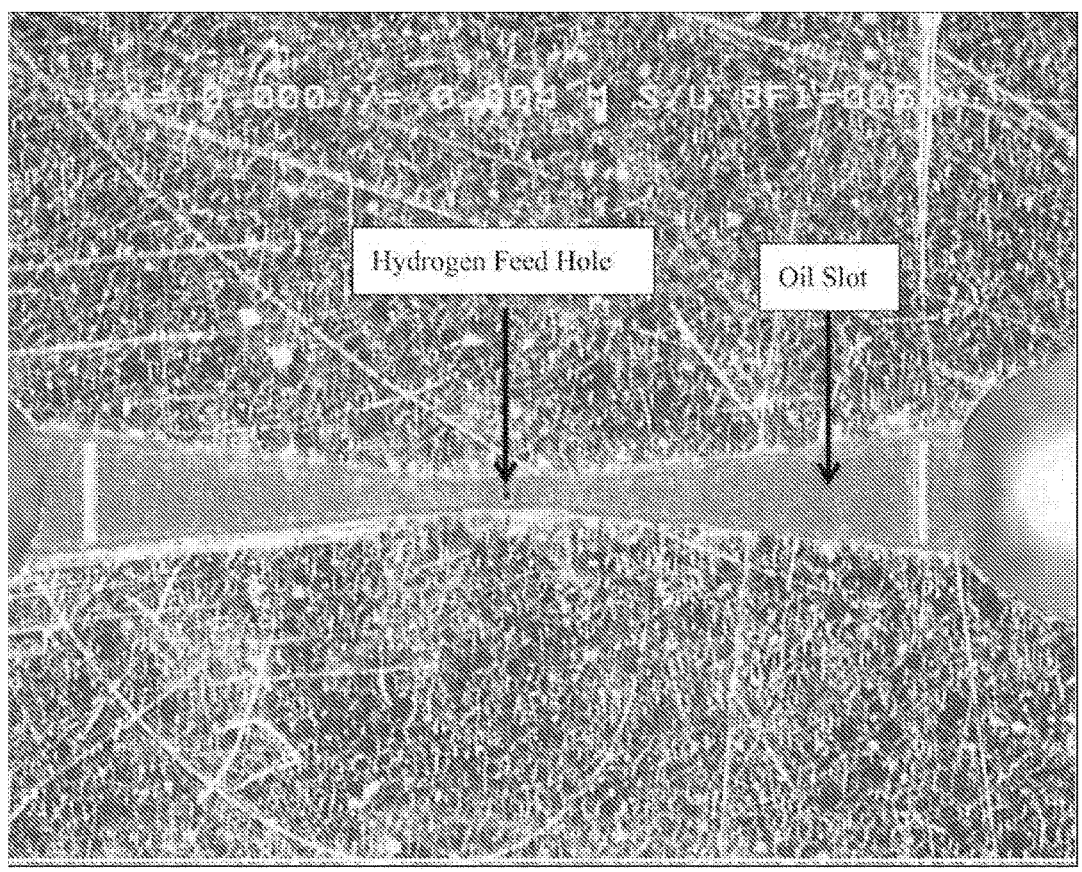
FIG. 4A is an electron micrograph illustrating a hydrogen feed port laser formed in a feedstock input slot.

FIG. 4 is a perspective view that provides an enlarged partial view of a feedstock injection area. FIG. 4 illustrates a plate 410 comprising plural feedstock injection slots 416. FIG. 4 also illustrates that the plate 410 comprises at least one gas injection port 424. Typically, each feedstock injection slot 416 also includes a gas injection port 424. FIG. 4A is an electron photomicrograph of a working embodiments plate 410 illustrating a gas injection port 424 laser formed in a feedstock injection slot 416. In certain embodiments, dimensions of the injection port 424 ranged from greater than 1 micron up to about 10 microns, but a person of ordinary skill in the art will appreciate that these dimensions may vary.

Figure 5:
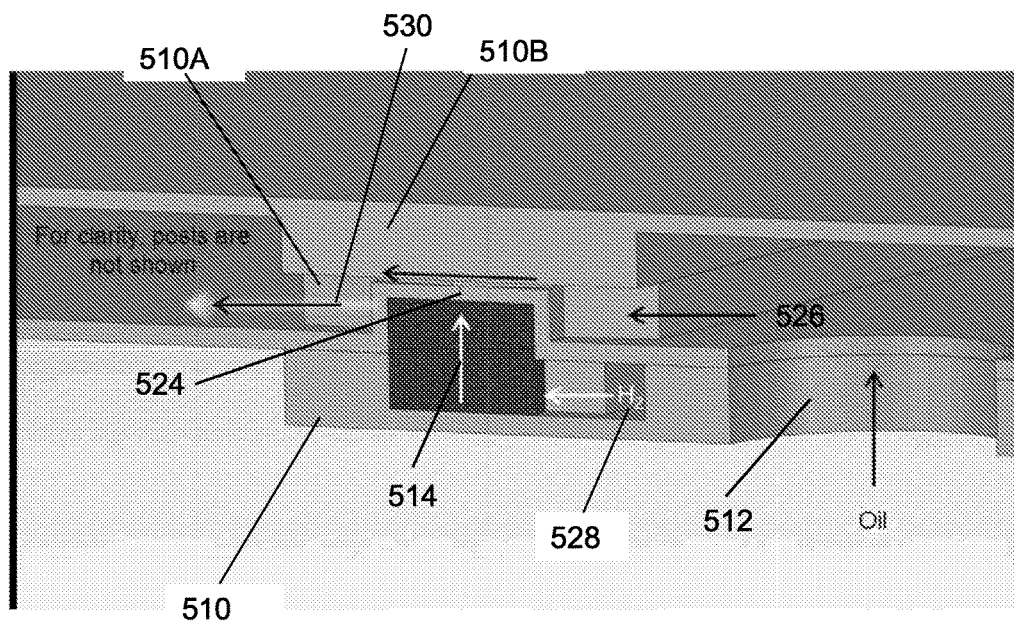
FIG. 5 is a cross sectional view of a feedstock injection slot illustrating a constricted flow path where a gas, for example hydrogen, is injected into the feedstock stream.

FIG. 5 is a cross sectional view of plates 510, 510A and 510B. FIG. 5 illustrates a constricted flow path whereby a gas, such as hydrogen, is injected into an oil stream. With particular reference to FIG. 5, feedstock flows into feedstock input port 512 as a feedstock stream 526. Feedstock stream 526 is then routed adjacent a fluid input port 528 to introduce a gas, such as hydrogen gas, for mixing with feedstock stream 526 through a gas nozzle 524. The oil injection port may include a venturi restriction at the hydrogen port to increase velocity, which facilitates shearing incoming hydrogen into bubbles. Feedstock stream 526 mixes with the input gas to form a multiphase mixed stream 530.

Figure 6:
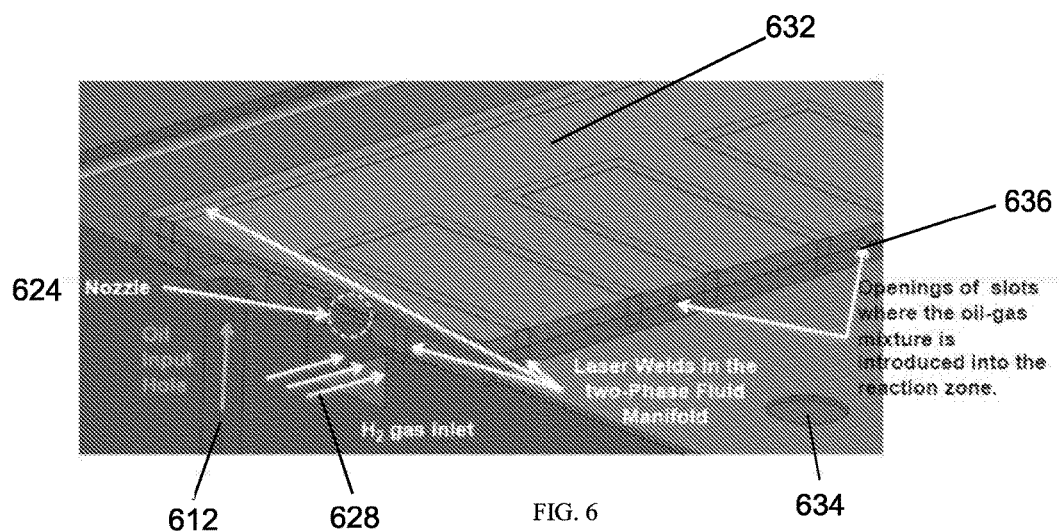
FIG. 6 is a perspective view of an exemplary injection manifold architecture, illustrating a feedstock input port, gas inlet channel, mixing zone, and slots where a feedstock-gas mixture is introduced into a reaction zone.

FIG. 6 provides as partial perspective view of portions of a plate illustrated in FIG. 5. Specifically, FIG. 6 illustrates a plate defining an oil input port 612. FIG. 6 also illustrates a hydrogen gas inlet port 628 for receiving a flow of hydrogen gas that flows through gas nozzle 624. FIG. 6 also illustrates that the two phase fluid manifold region 632 includes laser welds 634 to weld each of plural plates defining the manifold into a single assembly. FIG. 6 also illustrates that the plates define plural ports 636 for flowing a feedstock-gas two phase mixture into a reaction zone.

Figure 7:
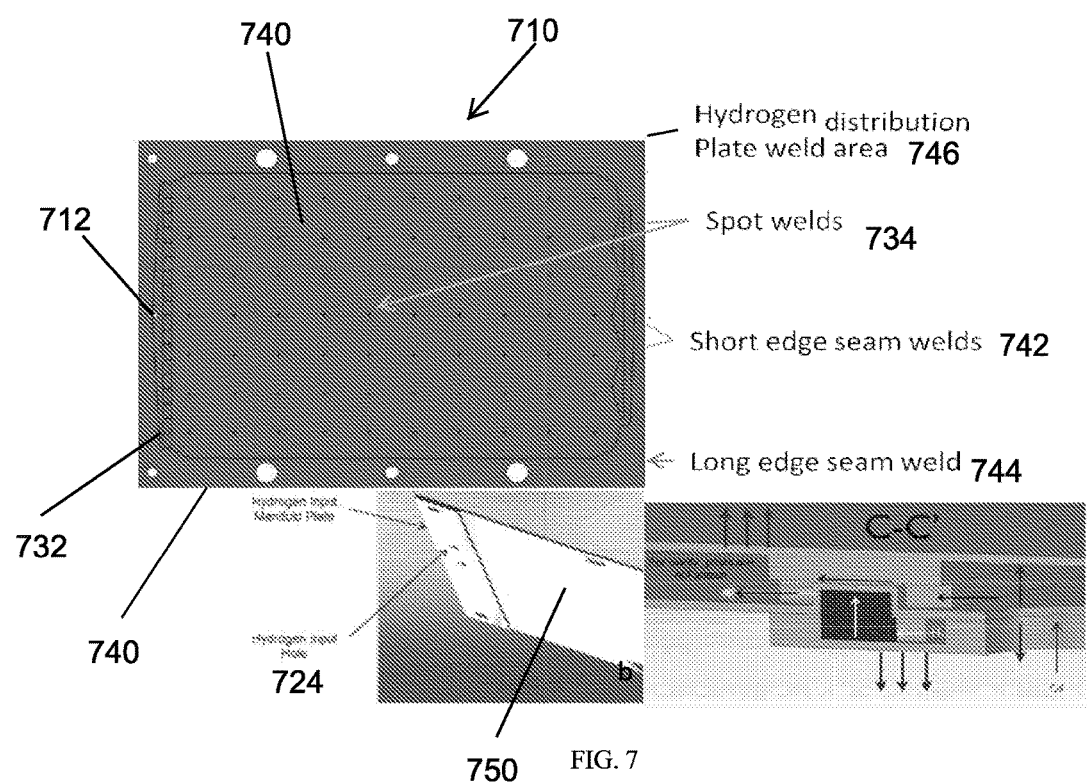
FIG. 7 provides a plan view of a reaction plate adjacent a perspective view of a hydrogen input manifold plate and a cross sectional view of a plate comprising feedstock and gas injection plates.

FIG. 7 includes a plan view of the hydrogen distribution plate illustrated in FIG. 3. Plate 710 further includes a feedstock injection port 712 for feeding feedstock to a manifold system 732. Feedstock and gas flowing into the reactor are mixed for flowing from the manifold system 732 and into the reaction area 740. Plate 710 includes several laser spot welds 734, short edge seam welds 742, and long edge seam welds 744. Plate 710 also includes a hydrogen distribution plate weld area 746.

Adjacent to plate 710 is a perspective view of hydrogen input manifold plate 750. Plate 750 includes at least one hydrogen input port 724 for flowing hydrogen into the hydrogen manifold 732. FIG. 7 also includes a cross sectional figure illustrating flow of feedstock and hydrogen into a plate assembly.

Figure 8:
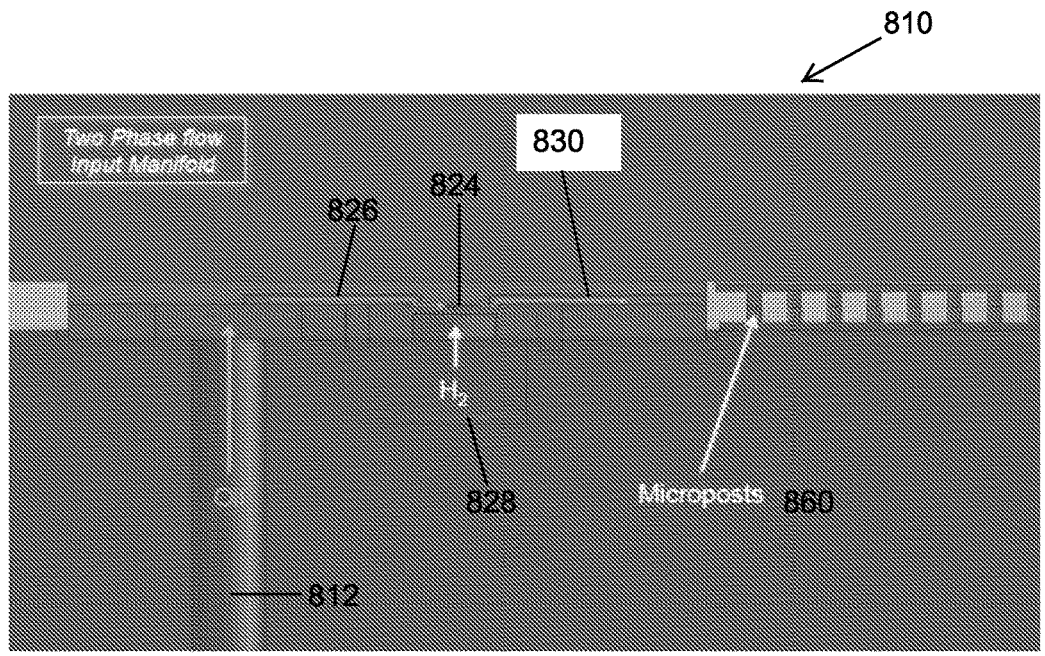
FIG. 8 is a cross sectional view of an exemplary embodiment comprising feedstock and gas injection ports, a mixing zone, and introduction of a reaction mixture into a reaction zone where microposts are located.

FIG. 8 is a cross sectional view of a plate 810 further showing feedstock input port 812 and hydrogen input port 828. Hydrogen flowing in input port 828 flows through hydrogen nozzle 824 for injecting hydrogen gas into the fluid flow 826. Two-phase fluid flow 830 then flows into a manifold comprising mixing posts 860.

Figure 9:
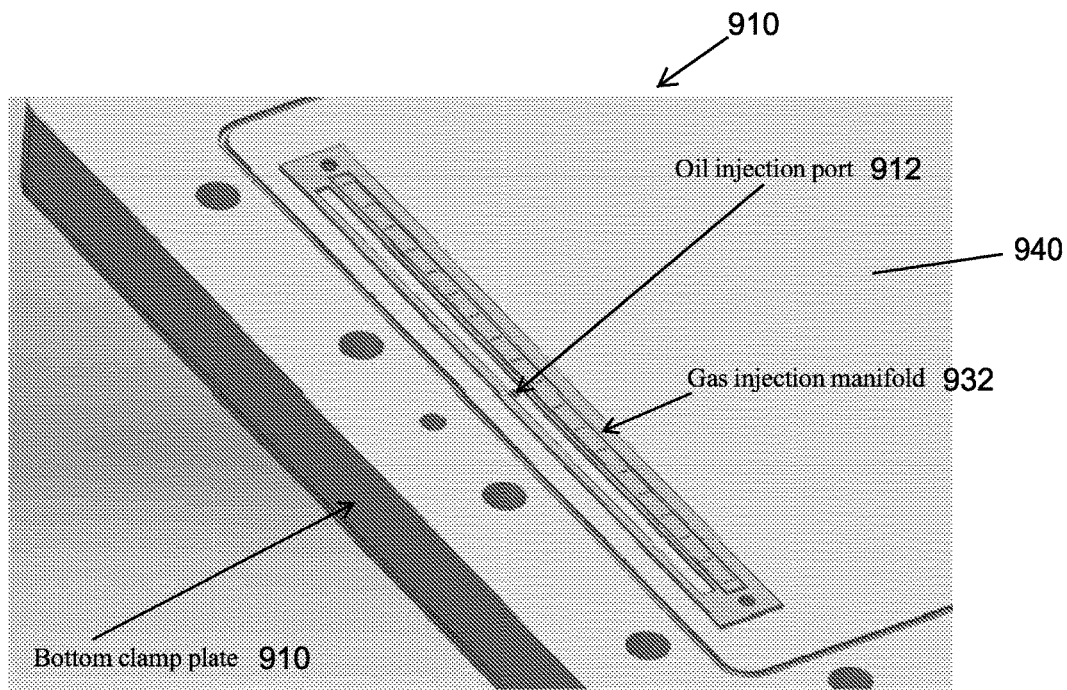
FIG. 9 is a perspective view of a plate comprising a feedstock injection port and a fluid manifold for one exemplary embodiment.

FIG. 9 shows a perspective view of a bottom clamp plate 910 defining a feedstock injection port 912 and an input manifold 932. Specifically, bottom clamp plate 910 includes a bottom clamp plate. Input manifold 932 distributes a two phase feedstock and gas mixture into a reaction zone 940.

Figure 10:
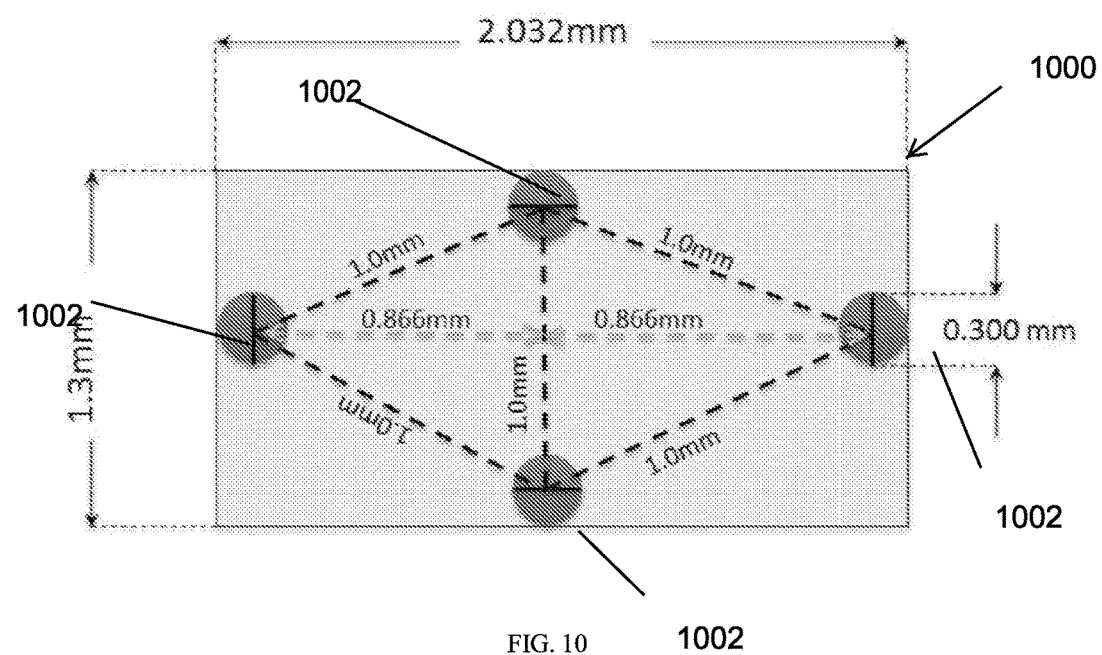
FIG. 10 illustrates an exemplary micropost structure pattern in a reaction zone created by lamina catalyst plates.

Certain disclosed embodiments utilize plates comprising microposts. FIG. 10 is a plan schematic view of a partial plate 1000 comprising plural microposts 1002. The microposts disrupt the phase interface between liquid and gaseous reactants, creating reaction zones. Although various different size microposts can be used, based on previous modeling and prior experience, the post size selected for certain disclosed embodiments was from about 0.1 millimeters to at least about 1 millimeter in height and in diameter, typically from about 0.2 millimeters to about 0.6 millimeters in height and in diameter, with certain working embodiments being 0.3 millimeters in diameter and 0.3 millimeters high. The height and diameter of the posts may, but do not need to be, the same. Photochemical etching was chosen as a best method for producing the post. This process is isotropic; accordingly, for certain embodiments spacing between the posts should be no more than 5:1 of the post height. Moreover, based on pressure drop considerations, a center spacing of 1.0 mm was chosen. Plate 1000 was populated with posts 1002 in a staggered configuration. A person of ordinary skill in the art will understand that the microposts 1002 may be substantially uniform in size and shape, and further that plate 1000 may be populated with the microposts in a substantially uniform distribution. Alternatively, reaction field may comprise microposts that define an array of structures having a gradient in density, a gradient in size, or both. For example, one end of a reaction field may have larger and sparse support structures, gradually decreasing in size and increasing in density approaching an opposite end of the reaction field. Moreover, while microposts illustrated by FIG. 10 are substantially cylindrical, microposts having any other geometric shape also can be used, including by way of example, square microposts, rectangular microposts, pyramidal microposts, tear-drop shaped microposts, elliptical microposts, polygonal microposts, or any combination of such shapes.

Figure 11:
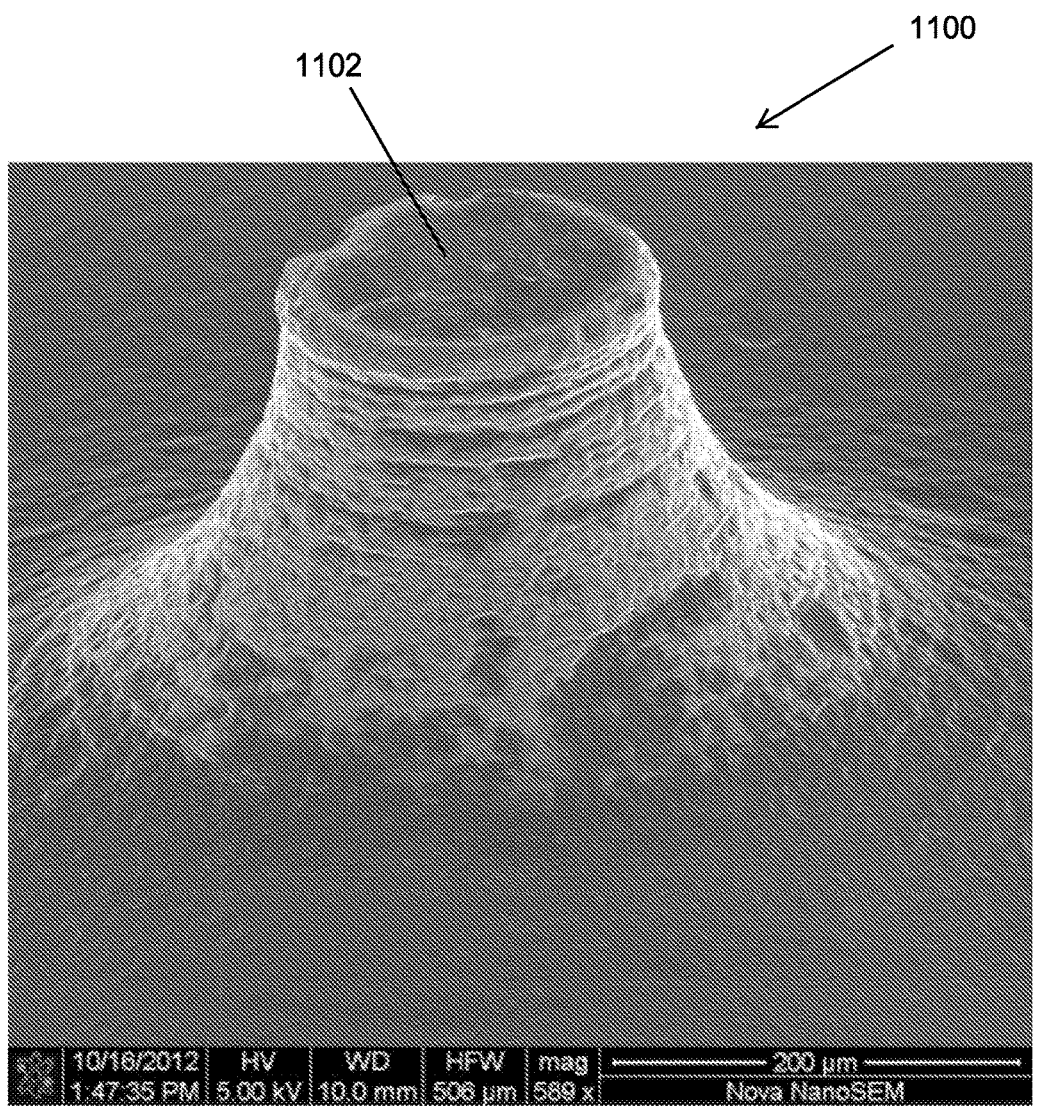
FIG. 11 is a scanning electron micrograph (SEM) image of an exemplary plate comprising microposts coated with two layers of 10 wt % alumina sol using an inverted drying method (the scale bar is 200 um) where the bottom of the post, which is the valley/surface, is densely coated with alumina sol and the wall is less densely coated.

FIG. 11 is a scanning electron micrograph (SEM) image of an exemplary micropost lamina 1100 comprising a single micropost 1102 (the scale bar is 200 um). In this embodiment, micropost 1102 was a coated micropost. For example, in certain embodiments micropost 1102 was coated with a catalyst material, such as a metal-impregnated alumina sol. Certain working embodiments were coated with two layers of 10 wt % alumina sol using an inverted drying method. The bottom of micropost 1102, which is the valley/surface, was densely coated with alumina sol and the wall is less densely coated.

For certain embodiments, the microposts are covered by a catalytic material selected for performing a particular reaction, such as production of BHD. A person of ordinary skill in the art will appreciate that the catalyst can be any catalyst suitable for performing the desired reaction. However, for certain disclosed embodiments Ni—Mo/Al$_2$O$_3$ was the selected catalyst, as this particular catalyst has been found to be particularly effective for hydrodeoxygenation (HDO) of vegetable oils. Deposition of this catalyst on alumina support deposited on the walls of the lamina plates was the preferred deposition method because it afforded high surface area and provided good mechanical strength at reaction conditions. Consideration was given to both in situ and ex situ deposition of catalyst in the production of a microreactor, by considering such requirements as catalyst activation requirements, fabrication method constraints and analytical constraints. Ex situ deposition of catalyst was selected as the best approach.

Disclosed embodiments of the catalyst plate can be substantially planar with no microposts. Alternatively, the catalyst plate can comprise at least one micropost, more typically plural microposts. Microposts enhance surface area for catalyst deposition, provide efficient heat and mass transport, as well as favorable flow hydrodynamics. Alumina sol solution has been successfully coated on large micropost lamina plate (MPL) substrates for subsequent reactor assembly and testing. An inverted drying technique was developed to improve the uniformity and coverage of the coating on all areas of the MPL substrate, such as MPL post walls and tops. The inverted drying approach involves performing a first dip coating, drying with the microposts facing up, and calcining, and then performing a second dip coating, drying the plate in an inverted position with the posts facing down, and calcining. The first coating coats thicker in the valleys between the posts that becomes thinner as it moves up the sides of the posts and may not fully coat the sides of the posts up to the tops. By drying and calcining the MPL plates upside down for the second coating, the sides and tops of the posts are completely coated.

Figure 12:
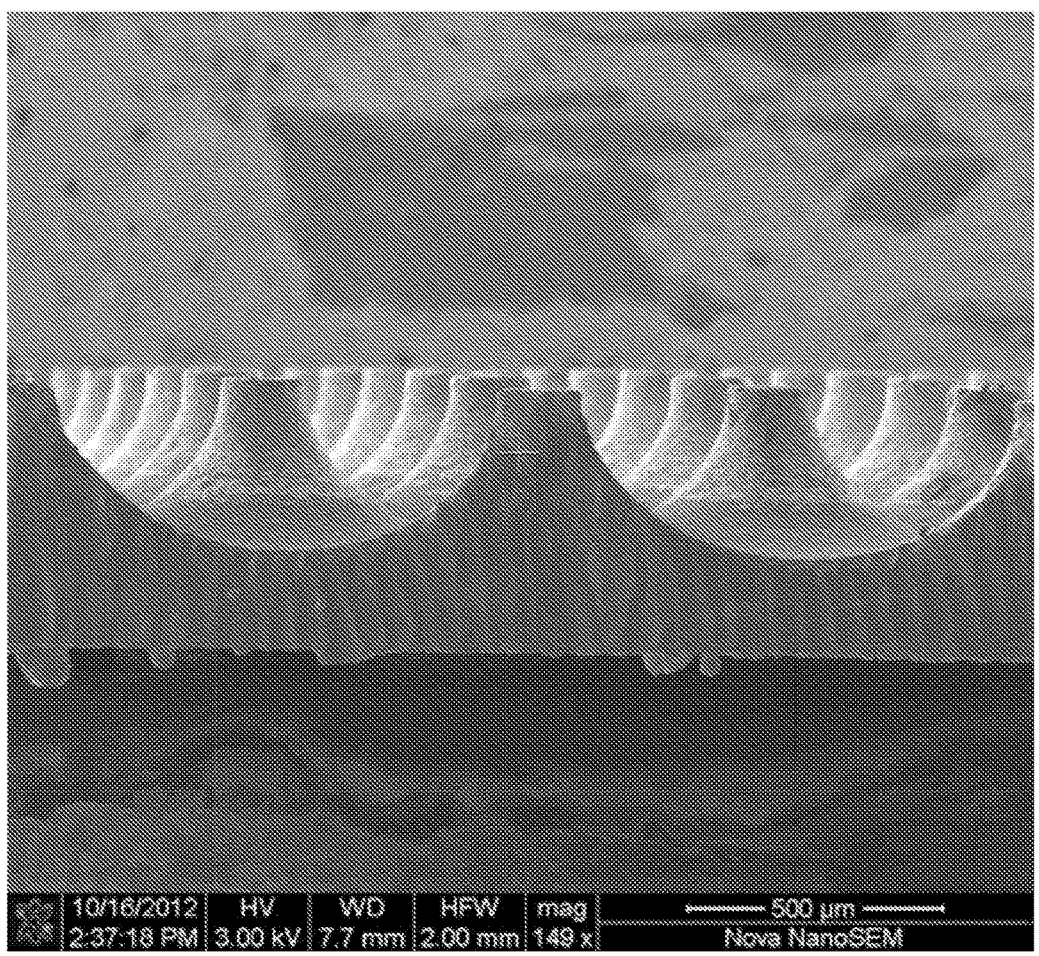
FIG. 12 is an SEM image of an exemplary lamina comprising an array of microposts coated with two layers of 10 wt % alumina sol using an inverted drying method (the scale bar is 500 um) illustrating alumina sol coating coverage.
Figure 13:
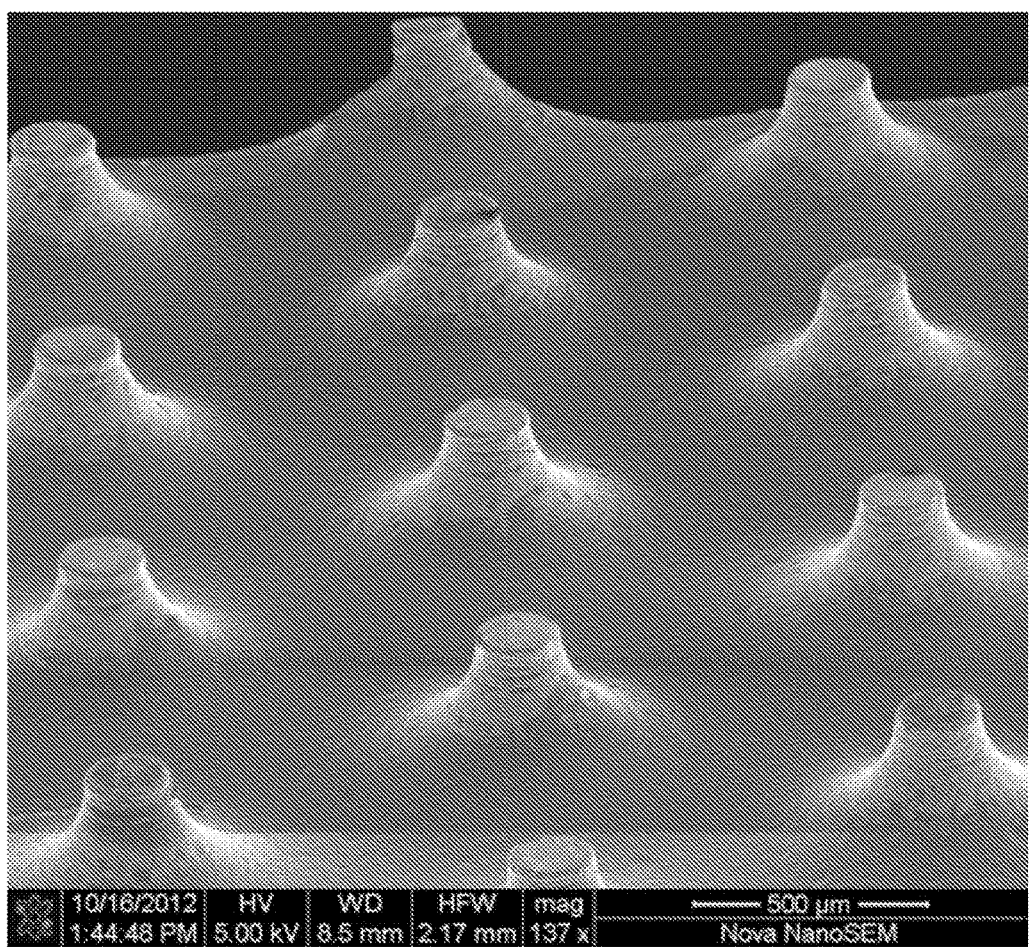
FIG. 13 is a perspective view SEM image of an exemplary lamina comprising an array of coated microposts.

FIG. 12 is an SEM image of an exemplary MPL comprising an array of microposts coated with two layers of 10 wt % alumina sol using the inverted drying method (the scale bar is 500 um). FIG. 13 is a perspective SEM image of an exemplary double coated micropost lamina reactor plate comprising an array of coated microposts. FIGS. 12 and 13 illustrate plural microposts to demonstrate alumina sol coating coverage on the plurality.

Figure 14:
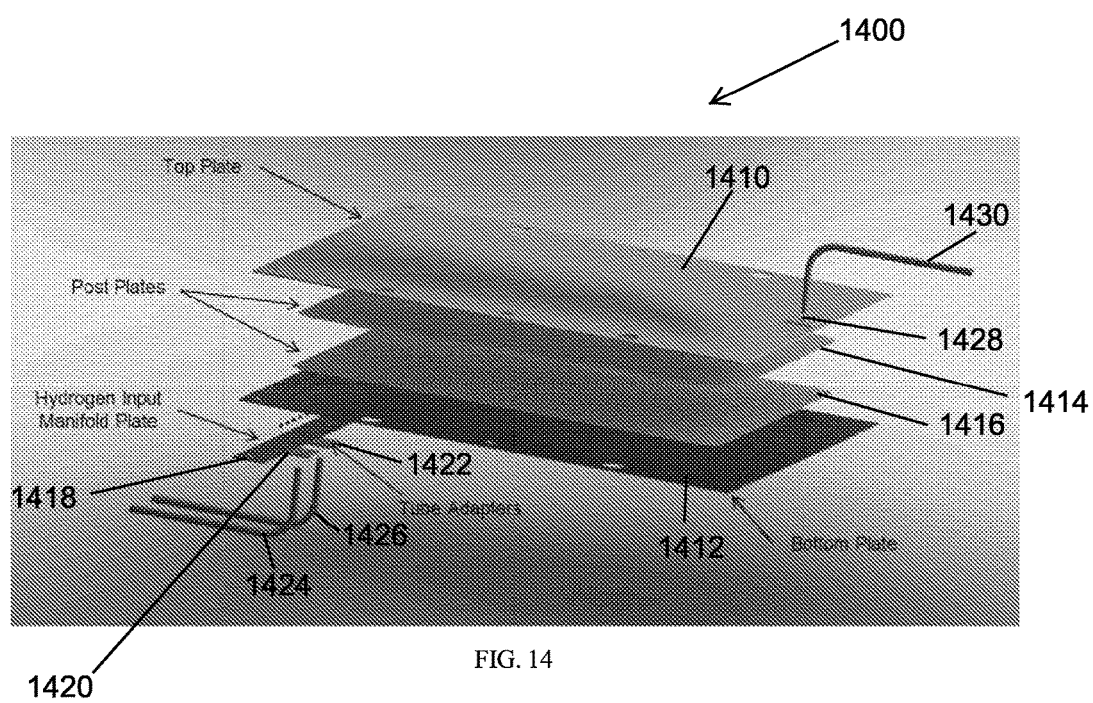
FIG. 14 is an exploded view of various parts of an exemplary microreactor comprising at least one lamina comprising an array of microposts.

FIG. 14 illustrates a microreactor embodiment 1400 comprising plural plates in a dissembled view. Particularly, FIG. 14 illustrates an embodiment comprising a top plate 1410 and a bottom plate 1412. Positioned between top plate 1410 and bottom plate 1412 are two post plates 1414 and 1416. Embodiment 1400 also includes a hydrogen input manifold plate 1418. Manifold plate 1418 includes tube adapters 1420, 1422, for receiving fluid input flow from input lines 1424 and 1426, respectively. Seals, such as O-rings (not shown) may be placed about these input lines 1424, 1426. Embodiment 1400 also includes a fluid output port 1428 fluidly coupled to a product output line 1430.

For certain embodiments, feedstock is provided to an MPL through a single input tube through the bottom plate. Feedstock flows into a manifold where it flows to the feedstock injection slots. Particular embodiments include a total of 19 feedstock injection slots to ensure substantially uniform flow along to and along the reactor area. A hydrogen input nozzle is formed, such as by laser forming, within some or all of the feedstock injection slots. The hydrogen input nozzle facilitate hydrogen bubble formation for mixing with the feedstock. The size of the hydrogen input nozzle is designed to limit the flow of hydrogen gas such that a desired molar ratio of gas-to-feedstock is provided. In certain disclosed embodiments, the desired molar ratio of gas-to-feedstock was a 30 molar ratio, which was maintained by ensuring constant hydrogen mass flow delivery. While the size of the hydrogen input nozzle may vary, it has been determined that a nozzle size of from about 2 um to about 5 um operates sufficiently for this purpose. The size of the feedstock injection slot was designed to increase the feedstock velocity at the point of hydrogen gas entry to shear the hydrogen gas and further facilitate bubble formation. As illustrated in FIG. 14, hydrogen gas is directed to the injection port through channels provided by plate 1418 attached to the underside of the bottom plate 1412.

For certain embodiments, clamp plates, such as 1410 and 1412, can include inlet and outlet inert gas ports, such as nitrogen ports. Including nitrogen input ports serves several purposes: (1) inert gas is used to purge the system of any oxygen, particularly oxygen contained outside the sealed reactor plates but within the clamps plates; (2) to provide a desired hydrogen gas atmosphere by decreasing hydrogen molar ratio following activating the system with an excess flow of hydrogen; and (3) to place the reactor plates under a slight positive pressure of nitrogen while the system is operating such that, if there is a reactor fluid leak, nitrogen penetrates into the reactor rather than oil, hydrogen, and/or BHD product leaking out.

Figure 15:
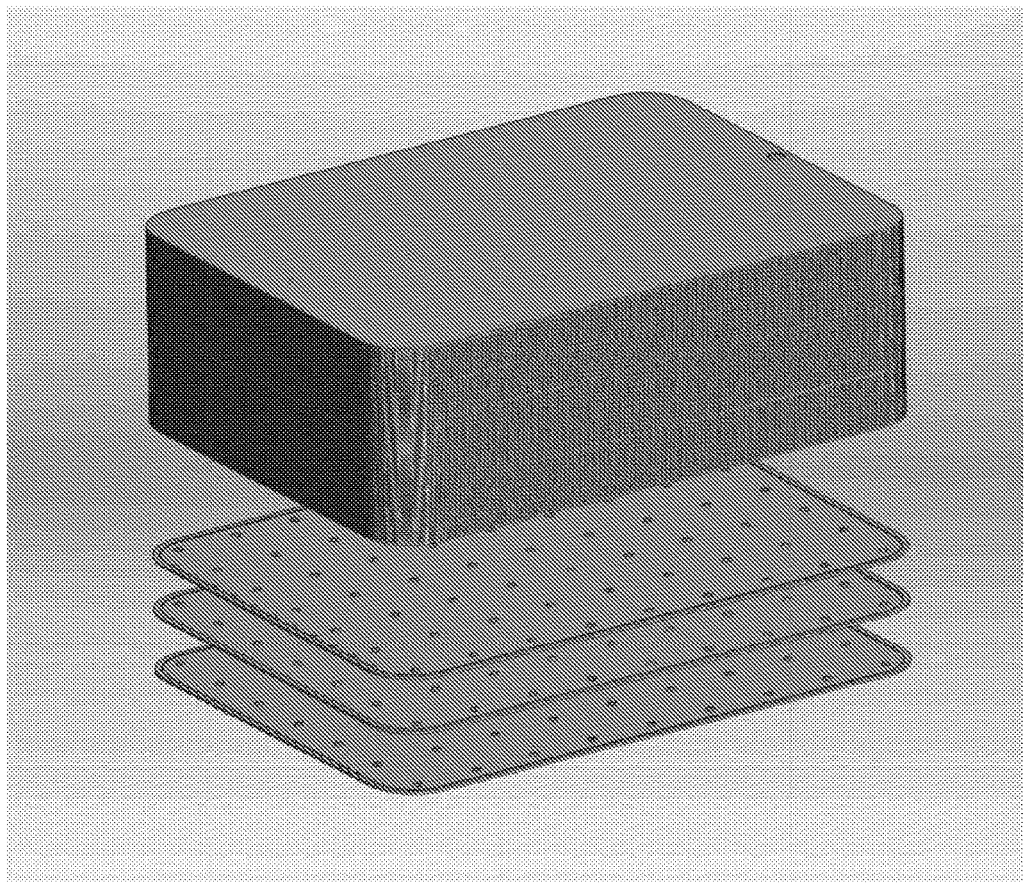
FIG. 15 illustrates an embodiment comprising multiple micropost lamina plates.
Figure 16:
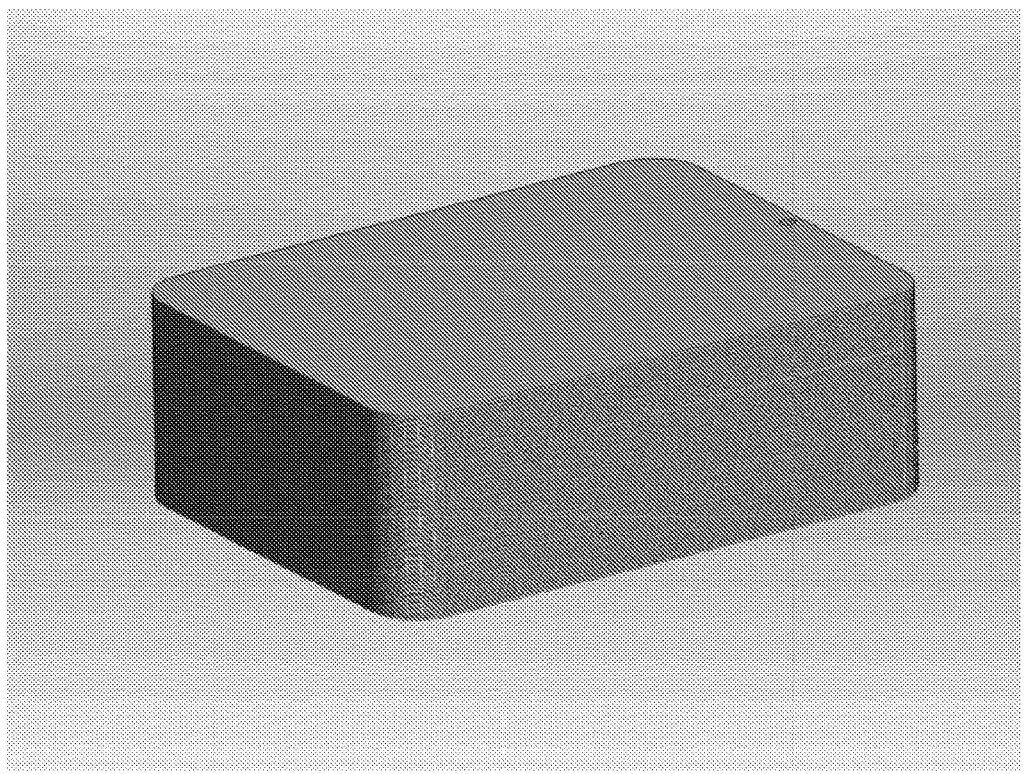
FIG. 16 illustrates an assembled stack comprising top, bottom and middle plate designs that are sealed around the perimeter.
Figure 17:
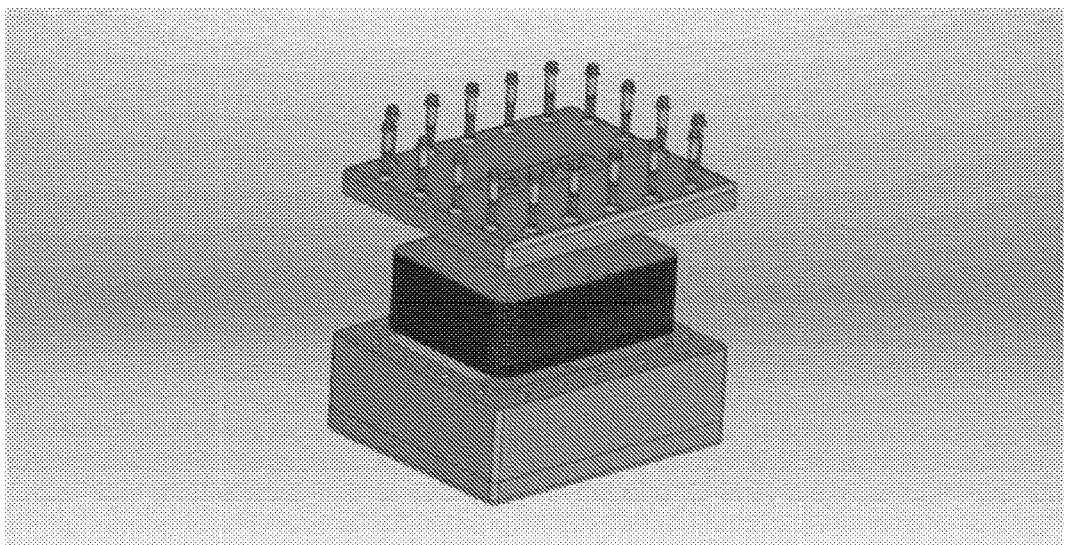
FIG. 17 illustrates a multiple-lamina reactor embodiment comprising a top clamp plate, a catalyst assembly, a catalyst chamber, and bottom clamp plate with mixer.

FIGS. 15-17 provide view of disassembled microreactors according to the present invention.

Figure 18:
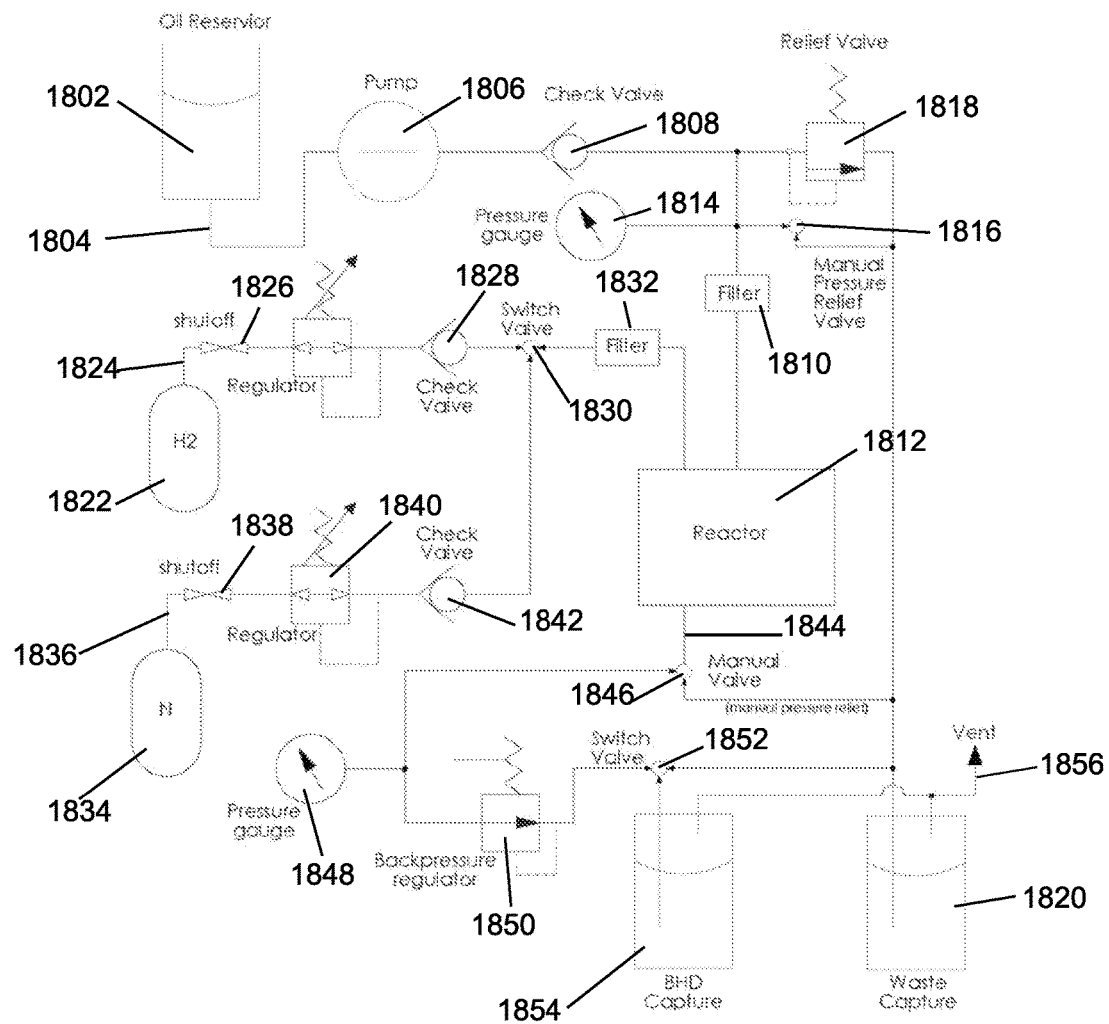
FIG. 18 illustrates a system flow schematic for an exemplary microreactor system.

FIG. 18 provides a plumbing schematic for a particular embodiment 1800 useful for making BHD. Embodiment 1800 includes an oil reservoir 1802 comprising an oil supply line 1804. Pump 1806 is fluidly coupled to the supply line 1804. Check valve 1808 is placed in the supply line 1804. Supply line 1804 supplies oil through a filter 1810 to a BHD microreactor 1812. A pressure valve also can be placed in supply line 1804 to monitor pressure in the line. If needed, pressure in the line can be reduced by actuating a pressure relief valve 1816. A second relief valve 1818 also can be used in supply line 1804 to allow excess oil flowing in line 1804 to flow to a capture tank 1820.

System 1800 also includes a hydrogen supply tank 1822. Hydrogen from tank 1822 flows through supply line 1824 to a shutoff valve 1826. Supply line 1824 also includes a regulator 1828 with a feedback loop to regulate flow and pressure in supply line 1824. Supply line 1824 also includes a hydrogen check valve 1828. Hydrogen supply line 1824 then feeds to a switch valve 1830 capable of switching flow of hydrogen to nitrogen to the reactor 1812. Filter 1832 may be placed in supply line 1824 to filter the hydrogen flow prior to entering reactor 1812. A seal may be placed around any hydrogen input line into reactor 1812, such as by using an O-ring.

System 1800 also includes a nitrogen supply tank 1834. Nitrogen from tank 1834 flows through supply line 1836 to a shutoff valve 1838. Supply line 1836 also includes a regulator 1840 with a feedback loop to regulate flow and pressure in supply line 1836. Supply line 1836 also includes a nitrogen check valve 1842. Nitrogen supply line 1836 then feeds to a switch valve 1830 capable of switching flow from hydrogen to nitrogen for flow to reactor 1812.

Reactor 1812 includes a product outflow supply line 1844. Supply line 1844 provides a flow of BHD from reactor 1812 through a manual pressure relief valve 1846. Supply line 1844 also includes a pressure gauge 1848 to monitor pressure in the line. Back pressure regulator 1850 regulates pressure in supply line 1844. Supply line 1844 then feeds product from reactor 1812 through a switch valve 1852. Switch valve 1852 can be actuated to allow supply line 1844 to provide desired product to a product collection tank 1854 or to a waste capture tank 1820. Both tank 1820 and 1854 may be vented through a vent line 1856.

For certain particular embodiments, a microreactor according to the present application for production of BHD included the following factors: microposts having a 300 micron diameter, and a 1000 micron center-to-center spacing; $H_2$ injection ports that were at least 2 microns, more preferably 10 microns, in diameter, in the middle of an 'oil input injection slot'; the reactor was laser welded and hermetically sealed, using deep, such as >1 mm penetration lap joints; the operating conditions were 450° C. and 500 psi (3.45 MPa); for certain embodiments, hermetic weld depths were from 900 microns to 1250 microns, which were achieved by varying the power of the welding laser, and achieving shear strengths in the weld joints of 582 and 604 MPa, respectively (=tensile strength of 776 and 805 MPa based on known 0.75 ratio between sheer and tensile properties); and high temperature compressible graphite was used to provide adequate hermetic seal between the clamp plates containing the micropost lamina plates.

Disclosed embodiments of the present microreactors can be coupled into a system to, for example, increase product output. Moreover, one or more reactors may be operably coupled to a computer system for controlling microreactor or microreactor system functions.

Figure 19:
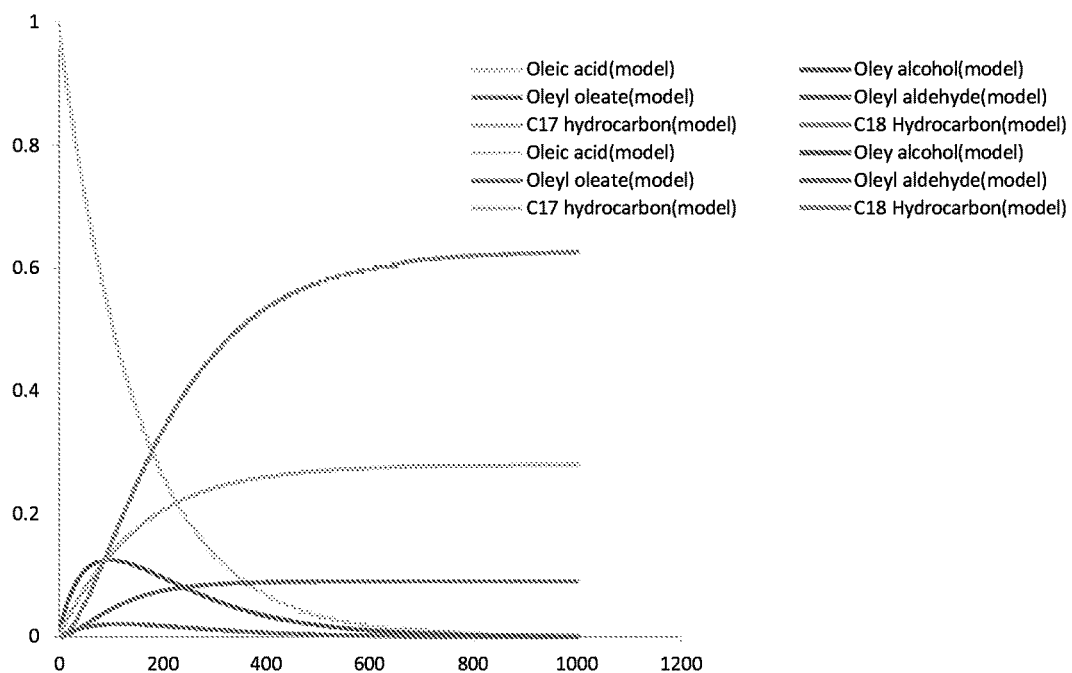
FIG. 19 is graph providing predicted steady state reactor performance of 5 wt % oleic acid hydrotreating at T=325° C., P=500 psig, with a catalysis loading=5 wt %, and an $H_2$/Oil ratio=139, at long liquid residence times.
Figure 20:
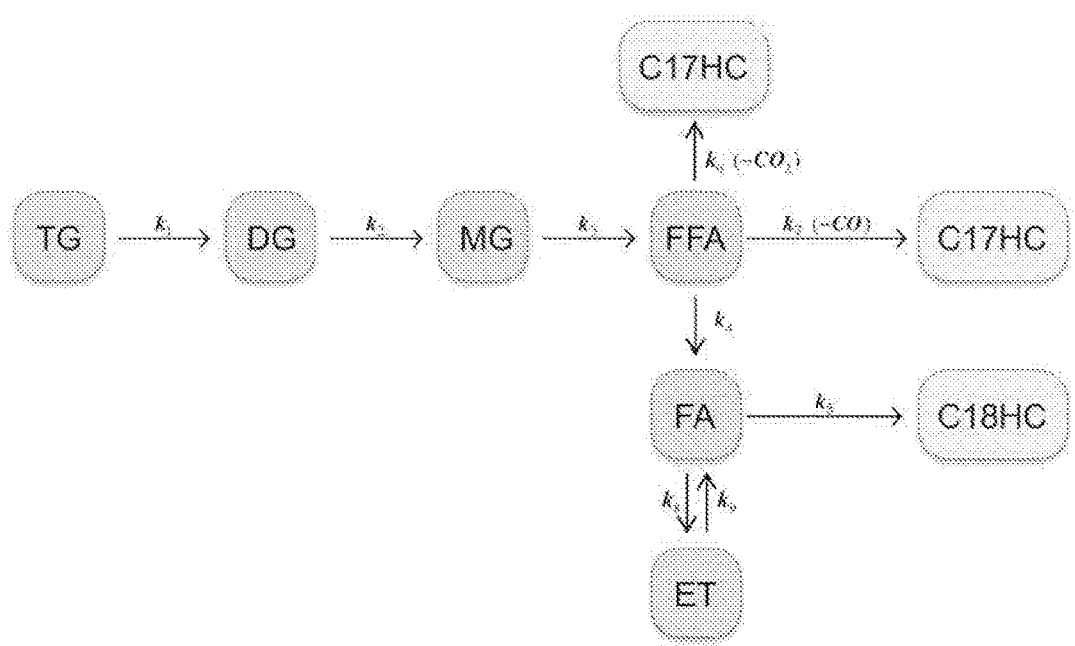
FIG. 20 provides a possible reaction scheme for the production of C17/C18 hydrocarbons from a triglyceride.

FIG. 19 provides the predicted steady state reactor performance for a microreactor according to the present application with oleic acid as the acid fed to the microreactor. The reactor performance conditions for 5 wt % oleic acid hydrotreating were T=325° C., P=500 psig, a catalyst loading=5 wt %, and an $H_2$/Oil ratio=139. FIG. 19 illustrates the production of various materials, but particularly greater than 0.6 relative amount of C18 hydrocarbons.

III. Method of Operating

FIG. 18 provides a plumbing schematic for one exemplary embodiment of the present invention, and serves as a basis for describing a method of operating a microreactor according to the present invention. The present discussion particularly concerns the production of BHD. However, a person of ordinary skill in the art will appreciate that other products could be made using disclosed embodiments of the microreactor by selecting different feedstocks and/or different catalysts.

A. BHD Feedstocks

For the production of BHD, any starting material that, upon hydrogenation or hydrodeoxygenation produces desired products, can be used to practice the present invention. BHD typically is produced from oils or fats, including fatty acids, which may be transesterified. Chemically, bio-diesel typically comprises fatty acids, or esters, such as methyl (or ethyl) esters. As used herein, the term "fatty acid" refers to a carboxylic acid with an aliphatic tail of at least 4 carbon atoms, more typically 6 carbon atoms, and even more typically 8 carbon atoms, and even more typically 12 carbon atoms in length, either saturated or unsaturated. Certain embodiments of the present invention used fatty acids having from about 12 carbon atoms to at least about 22 carbon atoms, which resulted in producing BHD generally having 17 or 18 carbon atoms. Most naturally occurring fatty acids have an even number of carbon atoms because the biosynthetic pathway utilizes acetate, which has two carbon atoms. Saturated fatty acids do not contain any double bonds or other functional groups along the chain. Unsaturated fatty acids are of similar form to saturated fatty acids, except that one or more alkene functional groups exist along the chain. As used herein, the terms "polyunsaturated fatty acid" or "PUFA" refer to a fatty acid which comprises at least two alkene groups (carbon-carbon double bonds).

Fatty acids may be derived from glycerides. A "monoacylglyceride" is a glyceride in which glycerol is esterified with one fatty acid. A "diacylglyceride" is a glycerol esterified with two fatty acids, which may be the same or different. A "triacylglyceride" is a glyceride in which glycerol is esterified with three fatty acids, which may be the same (e.g. as in tri-olein) or different. The simplest triglycerides are those where the three fatty acids are identical. Glyceride nomenclature may designate the constituent fatty acid: stearin derived from stearic acid; palmitin derived from palmitic acid; etc.

There are a number of suitable feedstocks for biodiesel including, by way of example, animal fats and vegetable oils. Particular examples of oils include castor oil, coconut oil, soybean oil, rapeseed oil, jatropha oil, mahua oil, mustard oil, flax oil, sunflower oil, linseed oil, olive oil, palm oil, peanut oil, thistle oil, hemp oil, field pennycress oil, *Pongamia pinnata* oil, etc. The fatty acid composition in the microreactor feedstock is determined by the particular fatty acid composition of the source material used. Examples of fatty acids that can be obtained from these sources include both saturated and unsaturated compounds, such as lauroleic, myristoleic, palmitoleic, petroselaidic, oleic, elaidic, ricinoleic, linoleic, linolaidic, linolenic, gadoleic, arachidonic and erucic acids or esters. Mixtures of esters, such as methyl and/or ethyl esters of these acids, are also suitable. For example, peanut oil contains by weight, on average (based on fatty acid): 54% oleic acid, 24% linoleic acid, 1% linolenic acid, 1% arachic acid, 10% palmitic acid and 4% stearic acid. Linseed oil typically contains: 5% palmitic acid, 4% stearic acid, 22% oleic acid, 17% linoleic acid and 52% linolenic acid. Olive oil mainly contains oleic acid. Palm oil contains: 2% myristic acid, 42% palmitic acid, 5% stearic acid, 41% oleic acid, and 10% linoleic acid. Rapeseed oil typically contains: 48% erucic acid, 15% oleic acid, 14% linoleic acid, 8% linolenic acid, 5% eicosenoic acid, 3% palmitic acid, 2% hexadecenoic acid and 1% docosadienoic acid. Rapeseed oil from new plants has higher levels of the unsaturated acids, including: erucic acid 0.5% oleic acid, 63% linoleic acid, 20% linolenic acid, 9% eicosenoic acid, 1% palmitic acid, 4% hexadecenoic acid, and 2% docosadienoic acid. 80 to 85% by weight of castor oil are glycerides of ricinoleic acid. Castor oil also contains: 7% oleic acid glycerides, 3% linoleic acid glycerides and about 2% palmitic and stearic acid glycerides. Soybean oil contains 55 to 65%, by weight, based on total fatty acids, of polyunsaturated acids, more particularly linoleic and linolenic acid. Sunflower oil contains: 1% myristic acid, 3 to 10% palmitic acid, 14 to 65% oleic acid and 20 to 75% linoleic acid.

In certain working embodiments, the starting material was a triglyceride, such as olein and palm stearin. The resulting product was a hydrocarbon, typically a straight-chain hydrocarbon with a high cetane number, which is very low in aromatic compounds and sulfur and does not contain oxygen. Products produced according to the present disclosure also can be blended with other fuels to form a fuel composition.

Starting materials can be provided to the microreactor neat, or as mixture with other materials, such as aliphatic hydrocarbons. In certain embodiments, the starting material was delivered to the microreactor as a mixture comprising from greater than 0 weight percent to at least 50 weight percent starting material in a hydrocarbon, such as dodecane, typically from about 5 weight percent to about 50 weight percent, with certain working embodiments using 5, 25 and 50 weight percent starting material in dodecane.

Starting material may be fed to the reactor using a pump and optionally through an inline filter to remove undesired particulate materials. The starting material can be fed to the reactor at a desired pressure, typically a pressure greater than atmospheric, such as a pressure greater than 20 psig up to at least 1000 psig, such as from about 100 psig to at least about 700 psig, more typically from 200 psig to 600 psig, and even more typically from 400 psig to 500 psig. Certain disclosed working embodiments operated at 500 psig.

B. Catalyst

Microreactors of the present invention typically include a catalyst. The catalyst may be deposited on microposts positioned in the reactor field. Any catalyst capable of producing BHD from starting materials can be used to practice the present invention. Platinum, palladium, rhodium, and ruthenium form highly active catalysts. Non-precious metal catalysts, especially those based on nickel (such as Raney nickel and Urushibara nickel) have also been developed as economical alternatives, but they are often slower or require higher temperatures.

Certain working embodiments used a Ni—Mo catalyst deposited on an alumina support in the oxide state (Ni—Mo/$Al_2O_3$). The catalyst was reduced back to the neutral state/sulfide using $H_2$ gas or a sulfidation agent, such as $H_2S$ or DMDS. Certain catalysts, such as the Ni—Mo catalyst, may need to be activated prior to use. For hydrogen catalyst activation, subsequent to deposition and reduction the temperature of the reactor was incrementally raised to a sufficient activation temperature, such as about 300° C. The system was then purged with an inert gas, typically nitrogen, for a time period of a few minutes to at least 30 minutes. The pressure was raised incrementally to a desired end working pressure of from 200 psig to at least 500 psig.

Catalysts also can be used at varying different relative amounts. For example, and with reference to the Ni—Mo catalyst, catalyst amounts ranging from greater than 0 wt % up to at least about 20 wt %, such as 5 wt %, 10 wt %, 15 wt %, or 20 wt %, can be used for hydrogenation/hydrodeoxygenation of the starting feedstock materials to produce BHD.

C. Introduction of Hydrogen

For the production of BHD, starting materials are subjected to hydrogenation/hydrodeoxygenation by introducing hydrogen to the reactor in the presence of a suitable catalyst. As indicated in FIG. 18, an external hydrogen source may be fluidly coupled to the reactor through a regulator, check valve and optionally an inline filter. Hydrogen can be introduced to a reactor after purging to provide a hydrogen-rich atmosphere. For certain working embodiments, purging was accomplished using nitrogen gas, followed by introducing hydrogen to provide a hydrogen-rich atmosphere comprising an excess of hydrogen, such as greater than 50% hydrogen up to virtually 100% hydrogen, such as a 60% hydrogen atmosphere, a 70% hydrogen atmosphere, an 80% hydrogen atmosphere, a 90% atmosphere, or greater. Working embodiments have used a hydrogen-rich reducing atmosphere comprising about 90 wt % hydrogen and about 10 wt % nitrogen.

The amount of hydrogen gas introduced relative to the starting material also can be varied, as will be understood by a person of ordinary skill in the art. For example, the relative amount of hydrogen-to-starting material can be substantially a 1:1 molar ratio, but typically an excess molar amount of hydrogen is used, such as greater than a 1:1 molar ratio up to at least about a 50:1 molar ratio, more typically a 10:1 molar ratio up to 40:1 molar ratio, and even more typically from about a 20:1 molar ratio to about a 30:1 molar ratio. Generally, the stoichiometric hydrogen-to-oil molar ratio is about 32 to 36 to provide for complete conversion of feedstock to product, and any excess hydrogen used is an amount greater than that resulting in a molar ratio of greater than about 36.

D. Operating Temperatures

Catalytic hydrogenation/hydrodeoxygenation can be accomplished at substantially room temperature. However, BHD production is more conveniently conducted at an elevated temperature. Operating temperatures therefore can range from about 25° C. up to at least 400° C., more typically greater than 100° C. to at least about 350° C., and even more typically from 200° C. to 350° C. Certain working embodiments used temperatures between about 275° C. and 325° C.

E. Operating Pressures

Catalytic hydrogenation/hydrodeoxygenation can be accomplished at substantially atmospheric pressure. However, BHD production is more conveniently conducted at a pressure greater than atmospheric pressure. Operating pressures therefore can range from about 1 atm (0 psig; 0.1 Mpa) up to at least 42 atm (602.5 psig; 4.26 MPa), typically from about 5 atm (58.8 psig; 0.5 MPa) to 35 atm (500; 3.5 MPa) psig, more typically from about 14.6 atm (200 psig; 1.48 MPa) to 35 atm (500 psig; 3.5 MPa).

F. Reaction Times (Reactor Residence Times)

Following introduction of starting materials and hydrogen into a reactor, the reaction times (reactor residence times) are such as to allow substantially complete hydrogenation/hydrodeoxygenation of the starting materials to produce desired products, such as BHD. Reaction times are a function of several factors, including temperature, pressure, catalyst type and relative amounts. Accordingly, a person of ordinary skill in the art will appreciate that the reaction times may vary and can be varied to provide desired results. Solely by way of example, reaction times are from about 1 second up to 300 seconds, typically from 50 to 250 seconds, more typically from 100 to 200 seconds. Certain working embodiments used reaction times of from about 125 seconds to 180 seconds.

IV. Examples

The following examples are provided to illustrate certain features of working embodiments. A person of ordinary skill in the art will appreciate that the present invention is not limited to the particular features exemplified by these examples.

Example 1

This example describes a process for making a catalyst and depositing the catalyst onto microposts on a micropost lamina (MPL). A micropost lamina was prepared, and then cleaned by immersing in a sonication bath filled with 1 wt % Alconox solution and sonicating for one hour, followed by rinsing with distilled water and ethanol. The cleaned MPL was dried in an oven maintained at 80° C. for 2 hours. The cleaned and dried MPL was thermally annealed in a vacuum furnace maintained at 1040° C. for 20 minutes, and then cooled to ambient temperature. Annealing the MPL in this manner effectively removes any plate warp that may occur while photochemically machining the plate to produce microposts.

A 10-wt % alumina isopropoxide was dissolved in water, peptized with acetic acid, and heated at about 80° C. for 48 hours with a reflux condenser. The solution was cooled to room temperature, and ethanol and P123 surfactant were added, followed by mixing at room temperature for 15 hours. After mixing, the mixture was heated to 50° C. to evaporate ethanol. The final mass of the solution was weighed to ensure that the alumina content was about 10 wt %.

Figure 21:
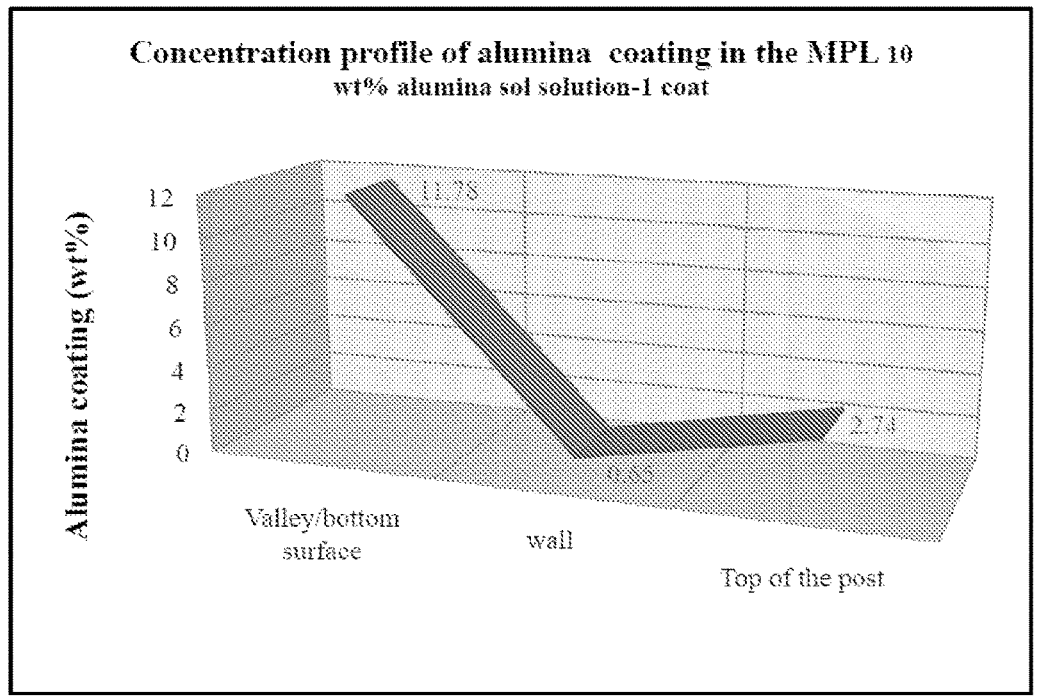
FIG. 21 is a concentration profile of a single catalyst coating on a micropost lamina.
Figure 22:
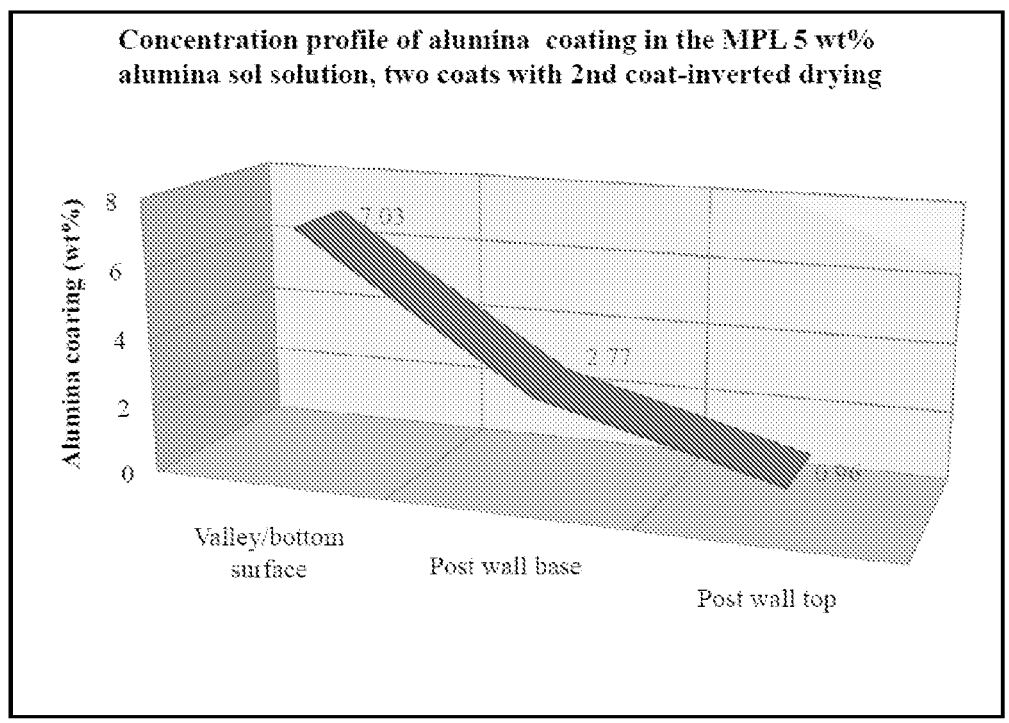
FIG. 22 is a concentration profile of two catalyst coatings on a micropost lamina, with the second coating applied using inverted plate drying.

A processed MPL plate (6 inch×8 inch) was coated with catalyst using an inverted drying technique. The MPL plate was first coated by immersing horizontally in a shallow bath containing about 250 milliliters alumina solution, withdrawn, and held in a vertical orientation until the solution fully drained from the substrate. The plate was rotated into a horizontal orientation, dried at 120° C. for 12 hours and then calcined at 500° C. for 5 hours to complete the first coating stage. The coated MPL substrate was then immersed horizontally in a shallow bath containing about 250 milliliters alumina solution, withdrawn, and held in a vertical orientation until the solution fully drained from the substrate. The twice coated plate was rotated into a horizontal position with the microposts facing downward, dried at 120° C. for 12 hours and then calcined at 500° C. for 5 hours to complete the second coating stage. Coating concentration profiles are provided for an MPL plate coated once (FIG. 21) and a second time using inverted drying (FIG. 22).

MPL plates coated with the alumina solution were then impregnated with active metals by immersing the plate in a shallow bath containing about 250 milliliters of active metal solution for 30 minutes at room temperature. The baths were periodically agitated. After 30 minutes, the MPL plate was withdrawn, held in a vertical orientation, and rinsed with deionized water. The metal impregnated plates were then dried at 120° C. for 12 hours, and calcined at 500° C. for 4 hours. Energy dispersive X-ray spectroscopy was used to analyze MPL plates, and confirmed that such MPL plates were coated with alumina and impregnated with active metals, such as molybdenum and nickel.

Example 2

This example concerns conversion of a feedstock comprising 5 wt % palm olein in dodecane to alkanes using one embodiment of a microreactor according to the present invention. Catalyst (10 wt % target Mo) was coated on a micropost plate, and catalyst plates were then installed in an eternal shell housing and a reactor welded. The welded reactor was then installed in external pressure clamp shells and tested for hermetic sealing with nitrogen. The catalyst was then activated using hydrogen and activation conditions described below. Experimental runs were then conducted using the conditions described in Table 1 below.

TABLE 1

| Feed (wt % in dodecane) | $H_2$/oil flow ratio (Nml/ml) | Temperature (° C.) | Pressure (psig) | Residence Time (sec.) |
|---|---|---|---|---|
| 5 wt % palm olein | 406 | 325 | 500 | 180 |
| 25 wt % palm olein | 406 | 325 | 500 | 180 |
| 50 wt % palm olein | 406 | 325 | 500 | 180 |

A. Catalyst Activation—The catalyst preparation process deposited Ni—Mo catalyst on the alumina support in the oxide state. The catalyst was reduced back to the neutral state/sulfide form before hydrotreating reactions were conducted. Catalyst reduction was conducted using $H_2$ gas or a sulfidation agent ($H_2S$ or DMDS). $H_2$ gas activation was used for a first reactor test and subsequent activation was done with 1.5 wt % sulfur in DMDS mixed with dodecane. The activation temperature program employed for the first BHD test incrementally increased the temperature of the catalyst to 300° C. over 1 hour. The system was initially purged with $N_2$ at room temperature for 30 minutes and pressure was raised to 500 psig. $H_2$ gas was slowly introduced into the system to provide 90% by volume $H_2$ and 10% by volume $N_2$. The system was maintained at these conditions for 10 minutes. The system was then heated at 10° C./minute to 120° C.

B. Results—The reactor performance was studied experimentally with palm olein vegetable oils and its model intermediate fatty acid. Superior performance was achieved using reactors according to the present invention relative to conventional reactors with hydrotreating of 5 wt % palm olein in dodecane. Specifically, 100% conversion of all glycerides molecules to mainly n-alkane hydrocarbons under just 3 minutes was achieved.

Oleic acid was used as a model fatty acid intermediate to study its conversion to an alkane at different temperatures (275° C.-325° C.), different pressures (200 psig-500 psig) and different liquid residence times (125-180 seconds). A $3^3$ factorial experimental design was used to evaluate reaction variables. Temperature was found to be the most important parameter, followed by pressure, and liquid residence time. A temperature of 325° C., a pressure of 500 psig and a reactor residence time of 180 seconds provided the best conditions for hydrodeoxygenation to desired n-alkane products.

The effect of catalyst loading at 5 wt %, 10 wt % and 20 wt % was also studied for hydrotreating oleic acid in a reactor according to the present invention operating at 500 psig of pressure, varying temperature, and varying liquid residence times. At 5 wt %, dispersion was low, but the Ni/Mo ratio was found to be provide good oleic acid conversion to hydrocarbons. The 10 wt % loading level doubled metal dispersion and Ni/Mo ratio. The conversion of oleic acid doubled to almost 100% and the products were primarily n-alkanes. However, at a 20 wt % loading, conversion was reduced as the catalyst dispersion was poor and surface area low.

Example 3

Figure 23:
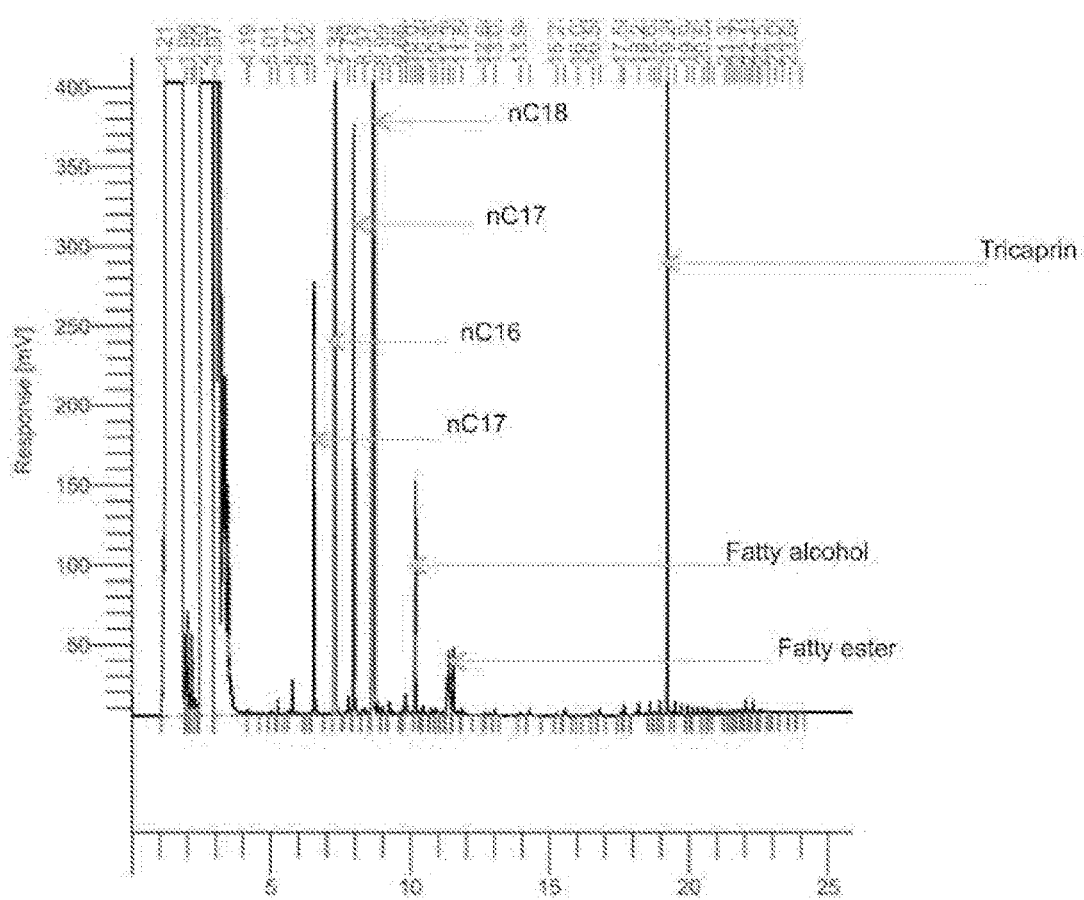
FIG. 23 is a gas chromatograph demonstrating the production of nC15-nC18 hydrocarbons using a disclosed embodiment of a microreactor and a palm olein feedstock after 45 minutes reaction time.
Figure 24:
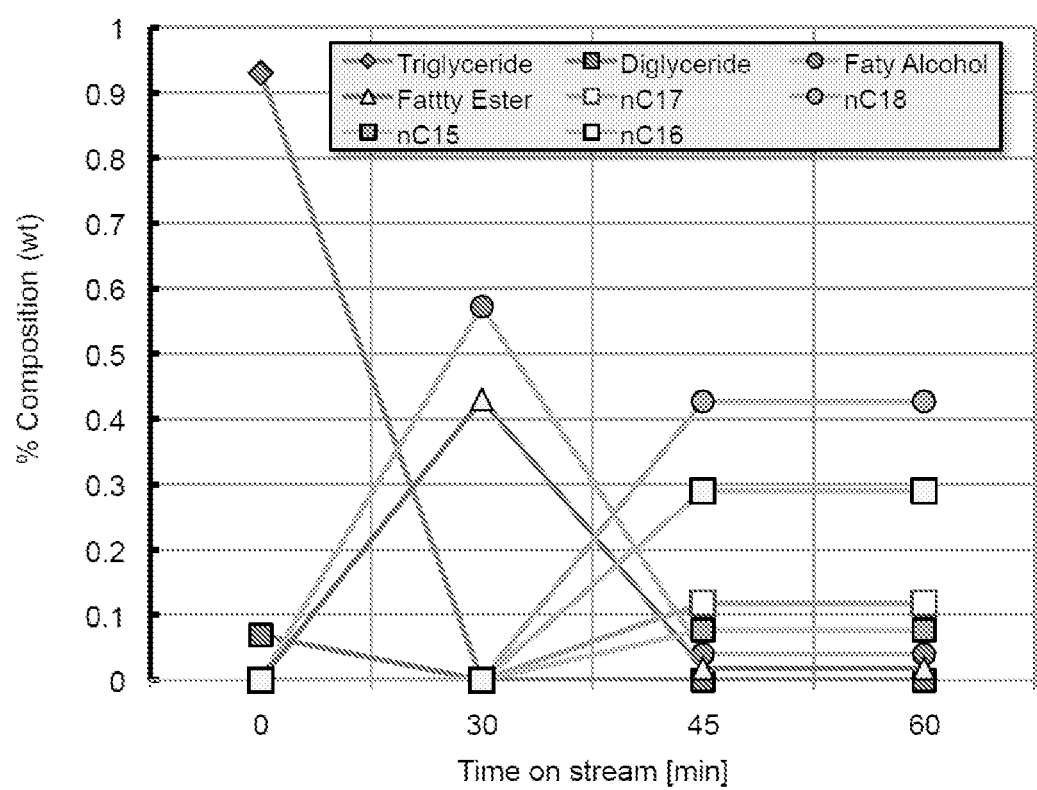
FIG. 24 is a graph of composition versus reaction time demonstrating reaction products produced as a function of time from a palm olein feedstock using one embodiment of a microreactor according to the present invention.
Figure 25:
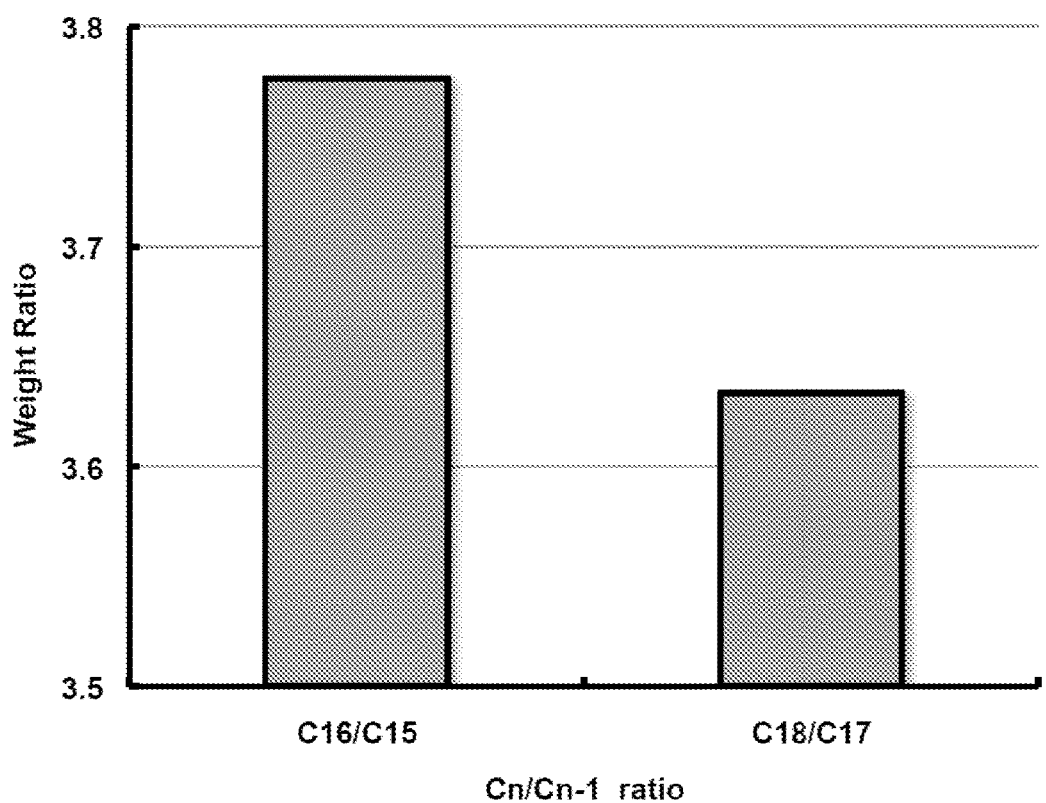
FIG. 25 is a graph of weight ratio versus Cn/Cn-1 ratio demonstrating that hydrodeoxygenation was the main deoxygenation process that occurred using a Ni—Mo/$Al_2O_3$ catalyst to process a palm olein feedstock using one embodiment of a microreactor according to the present invention.

The hydrogenation of palm oil was conducted using a microreactor according to the present invention using a hydrogen flow rate of 810 ml/minute. An oil composition comprising 5-wt % palm olein and 95-wt % dodecane was introduced to the reactor at a flow rate of 2.2 ml/minute. The reaction was carried out at 315° C. and 500 psig. The products were then collected at time intervals of 30 minutes, 45 minutes and 60 minutes and analyzed later on a gas chromatograph. As demonstrated by FIG. 23, substantially complete conversion of palm oil to linear hydrocarbons was achieved at 45 minutes. Product distribution was mainly C15 to C18 linear alkanes (91.5 wt %) with a small fraction comprising oxygenated intermediates. Palm olein primarily comprises C16 and C18 hydrocarbons, and decarbonylation and decarboxylation produce nC17 and nC15 hydrocarbons. FIG. 25 provides the relative weight ratios of C16/C15 and C18/C17 hydrocarbons that were produced from palm.

3 hours of catalyst activation, palm oil feedstock was introduced to the reactor to produce bio-hydrogenated diesel. Products were then collected every hour for 7 hours of time on stream (TOS). Table 2 below provides data establishing that a 99% conversion of palm oil to linear hydrocarbons occurred, along with some oxygenated intermediates.

TABLE 2

|  | Time on stream (hours) | | | | | | |
| --- | --- | --- | --- | --- | --- | --- | --- |
|  | 1 | 2 | 3 | 4 | 5 | 6 | 7 |
| Conversion of triglycerides | 75.20 | 96.62 | 99.56 | 96.96 | 97.88 | 96.34 | 85.80 |
| Selectivity | | | | | | | |
| Total C15-C18 | 71.02 | 61.01 | 74.37 | 71.69 | 70.94 | 67.91 | 66.05 |
| n-C15 | 7.52 | 4.30 | 7.13 | 6.92 | 7.14 | 6.24 | 1.99 |
| n-C16 | 28.35 | 23.75 | 25.37 | 24.18 | 21.24 | 30.17 | 26.99 |
| n-C17 | 9.80 | 8.11 | 10.49 | 10.81 | 13.60 | 8.42 | 9.15 |
| n-C18 | 25.36 | 24.85 | 31.38 | 29.78 | 28.96 | 23.08 | 27.92 |
| (C15 + C17)/(C16 + C18) | 0.32 | 0.26 | 0.31 | 0.33 | 0.41 | 0.28 | 0.20 |
| Intermediates | 28.98 | 35.64 | 25.05 | 27.52 | 27.28 | 32.09 | 33.95 |
| hexadecanol | 2.64 | 1.99 | 1.00 | 1.15 | 2.31 | 5.79 | 7.29 |
| palmitic acid | 18.16 | 14.50 | 10.65 | 9.10 | 1.62 | 22.56 | 26.66 |
| octadecanol | 0.00 | 0.00 | 0.00 | 0.00 | 0.00 | 0.00 | 0.00 |
| oleic acid | 0.00 | 0.00 | 0.00 | 0.00 | 0.00 | 0.00 | 0.00 |
| stearic acid | 0.00 | 0.00 | 0.00 | 0.00 | 0.00 | 0.00 | 0.00 |
| monoglyceride | 0.00 | 0.00 | 0.00 | 0.00 | 0.00 | 0.00 | 0.00 |
| diglyceride | 0.00 | 5.49 | 2.00 | 6.28 | 5.59 | 3.73 | 0.00 |
| Intermediates | 8.18 | 13.66 | 11.40 | 10.98 | 17.76 | 0.00 | 0.00 |
| Light hydrocarbon (C14) | 0.00 | 3.34 | 0.58 | 0.79 | 1.77 | 0.00 | 0.00 |
| Total | 100.00 | 100.00 | 100.00 | 100.00 | 100.00 | 100.00 | 100.00 |

Example 4

Bio-hydrogenated diesel was produced by hydrogenation of palm oil using an open MPL reactor according to the present invention, using a 95 $H_2$/oil mole ratio at 500 psig and 325° C. The MPL reactor was "open" for this example because the plates of the reactor (e.g. top catalyst plate and bottom catalyst plate) were not welded to each. Accordingly, the MPL reactor could be opened and the components separated, such as separating the top catalyst and bottom catalyst plate after a hydrogenation trial, as illustrated by FIG. 1, with reference to catalyst plates 118 and 120, and FIG. 2, with reference to plates 218 and 220. Moreover, using an MPL open reactor allows such components to be inspected and, if needed, replaced, after a hydrogenation trial. A superior flexible graphite seal was installed in an internal groove formed in a bottom clamp plate to substantially preclude a reduction in the operating pressure. An NiMo/$Al_2O_3$ catalyst was prepared by suspension using a Ni:Mo ratio of about 3:7. Catalyst plates were coated with alumina as a primer followed by coating with a suspension of NiMo/$Al_2O_3$. The bio-hydrogenated diesel production process was initiated by activating the catalyst with hydrogen and 1.5% dimethyl disulfide (DMDS) in dodecane. After In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

We claim:
1. A microreactor, comprising:
   a bottom clamp plate; a top clamp plate;
   a catalyst plate positioned between and operatively associated with the bottom clamp plate and the top clamp plate, the catalyst plate comprising a catalyst associated therewith for catalyzing the production of biohydrogenated diesel (BHD) from a suitable feedstock; and
   a mixer plate assembly,
   wherein at least one of the bottom clamp plate, the top clamp plate and the catalyst plate includes a feedstock inlet port for receiving a flow of feedstock, a hydrogen input port for receiving a flow of hydrogen for mixing with the feedstock, and an exit port for receiving a flow of BHD produced by the microreactor,
   wherein the catalyst plate comprising a plurality of microposts sized, shaped and positioned to disrupt a phase interface between liquid and gaseous reactants to create reaction zones.
2. The microreactor according to claim 1, wherein the bottom clamp plate includes a fluid input port and the top clamp plate includes a product exit port.
3. The microreactor according to claim 1, wherein at least one of the bottom clamp plate, the top clamp plate, and the catalyst plate are made from steel.

4. The microreactor according to claim 3, wherein the steel is 316 stainless steel, and the plates have a thickness of from about 0.3 mm to about 1.0 mm.

5. The microreactor according to claim 4, wherein at least one of the bottom clamp plate, the top clamp plate, and the catalyst plate has a thickness of from about 15 millimeters to about 30 millimeters.

6. The microreactor according to claim 1, further comprising at least one fluid seal.

7. The microreactor according to claim 1, further comprising at least one of plural clamp fasteners and plural laser welds, to fixedly associate the bottom clamp plate, the top clamp plate and the catalyst plate together to form an assembled microreactor.

8. The microreactor according to claim 1, wherein the catalyst plate defines a reaction area whereby fluid feedstock flowing into the reactor is exposed to the catalyst.

9. The microreactor according to claim 1, wherein the device includes a feedstock input manifold for receiving a flow of feedstock from the feedstock inlet port.

10. The microreactor according to claim 9, comprising at least one feedstock injection slot through which feedstock flows from the manifold and to a reaction area defined by the microreactor for associating feedstock with the catalyst.

11. The microreactor according to claim 10, wherein the device further includes at least one hydrogen input port for receiving a flow of hydrogen for mixing with the feedstock.

12. The microreactor according to claim 11, wherein the at least one feedstock injection slot is fluidly associated with the at least one hydrogen input port for mixing feedstock with hydrogen.

13. The microreactor according to claim 10, wherein the reaction area includes plural internal support posts.

14. The microreactor according to claim 10 wherein the reaction area has length and width dimensions of from about 100 millimeters to about 300 millimeters.

15. The microreactor according to claim 12, wherein the feedstock injection slot includes a venturi restriction adjacent the hydrogen input port to increase flow velocity to shear incoming hydrogen into bubbles.

16. The microreactor according to claim 11, further comprising a hydrogen distribution plate for flowing hydrogen to the feedstock to form a two-phase, feedstock-hydrogen mixture for distribution to the reaction area.

17. A system, comprising at least one microreactor according to claim 1.

18. The system according to claim 17, further comprising a feedstock source and a hydrogen source fluidly coupled to an inlet of the at least one microreactor, and a product line fluidly coupled to the product outlet port of the at least one microreactor.

19. A method, comprising operating a microreactor or a microreactor system according to claim 1 to produce BHD.

20. The method according to claim 19, comprising flowing a glyceride feedstock to the microreactor or microreactor system.

* * * * *